(12) United States Patent
Boyer et al.

(10) Patent No.: US 7,386,317 B2
(45) Date of Patent: Jun. 10, 2008

(54) METHODS AND TECHNIQUES IN CHANNEL ASSIGNMENT IN A CELLULAR NETWORK

(75) Inventors: Pete A. Boyer, Somerville, MA (US);
David F. Freeman, Billerica, MA (US);
Pablo A. Vicharelli, Carlisle, MA (US);
Philip G. Rossoni, Belmont, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 11/362,073

(22) Filed: Feb. 27, 2006

(65) Prior Publication Data
US 2006/0142015 A1    Jun. 29, 2006

Related U.S. Application Data

(63) Continuation of application No. 10/754,459, filed on Jan. 9, 2004, now Pat. No. 7,050,812, which is a continuation of application No. 09/464,301, filed on Dec. 15, 1999, now Pat. No. 6,871,073.

(51) Int. Cl.
*H04Q 7/20* (2006.01)
(52) U.S. Cl. .................. 455/447; 455/453; 455/524; 455/425; 455/456; 455/410
(58) Field of Classification Search .............. 455/423, 455/452.1, 446, 447, 448
See application file for complete search history.

(56) References Cited

U.S. PATENT DOCUMENTS

| | | | | |
|---|---|---|---|---|
| 4,435,840 | A * | 3/1984 | Kojima et al. | 455/524 |
| 5,713,072 | A * | 1/1998 | Marth et al. | 455/410 |
| 5,835,859 | A * | 11/1998 | Doner | 455/447 |
| 6,128,500 | A * | 10/2000 | Raghavan et al. | 455/453 |
| 6,212,386 | B1 * | 4/2001 | Briere et al. | 455/447 |
| 6,522,888 | B1 * | 2/2003 | Garceran et al. | 455/456.3 |
| 2002/0019233 | A1 * | 2/2002 | Leung et al. | 455/447 |
| 2002/0093926 | A1 * | 7/2002 | Kilfoyle | 370/335 |
| 2005/0059390 | A1 * | 3/2005 | Sayers et al. | 455/524 |

* cited by examiner

*Primary Examiner*—David Q. Nguyen

(57) ABSTRACT

A cellular network configuration tool is described that performs frequency assignments for use in a cellular network. The channels are assigned in accordance with input configuration data such as a channel separation matrix, geographic data, and requested channel assignments for each sector included in the cellular network being configured. The configuration is performed in accordance with predetermined constraints and criteria and quality of service input. The tool uses frequency assignment techniques to perform the channel assignments in accordance with varying constraints and criteria.

4 Claims, 19 Drawing Sheets

|   | 0 | 1 | 2 | 3 | 4 | 5 | 6 |
|---|---|---|---|---|---|---|---|
|   | A | A | A | B | B | A | B |
| 7 | A | A | A | B | B | B | B |
| 14 | A | A | A | A | B | B | X |
| 21 | A | A | A | B | B | B | A |
|   | ⋮ | ⋮ | ⋮ | ⋮ | ⋮ | ⋮ | ⋮ |

| HEURISTIC DECISION CATEGORY | LABEL | DESCRIPTION |
|---|---|---|
| SECTOR SELECTION CRITERIA (SSC) 410 | SSC1 | • PICK THE SECTOR THAT HAS THE SMALLEST VALUE OF # AVAILABLE FREQUENCIES/(NEEDED + BIAS) WHERE, <br>  • # AVAILABLE FREQUENCIES - ALL POSSIBLE FREQUENCIES FOR THE SECTOR THAT DO NOT VIOLATE THE FREQUENCY SEPARATION CONSTRAINTS BASED ON THE PARTIAL FREQUENCY ASSIGNMENT BEING CONSIDERED <br>  • NEEDED - THE NUMBER NEEDED FREQUENCY ASSIGNMENTS FOR THE SECTOR <br>  • BIAS - AN ACCUMULATED BIAS OVER PAST ITERATIONS DETERMINED BY THE CRITERIA ADJUSTMENT <br> • IF THERE IS A TIE PICK THE SECTOR WITH THE SMALLEST VALUE DURING THE PREVIOUS ITERATION <br> • IF THERE IS STILL A TIE PICK THE SECTOR WITH THE SMALLEST VALUE OVER THE NEXT PREVIOUS ITERATION ... |
| 412 | SSC2 | SAME AS SSC1 EXCEPT THAT # OF AVAILABLE FREQUENCIES - ALL POSSIBLE FREQUENCIES FOR THE SECTOR THAT DO NOT VIOLATE THE FREQUENCY SEPARATION CONSTRAINTS OR THE C/I CONSTRAINTS BASED ON THE PARTIAL FREQUENCY ASSIGNMENT BEING CONSIDERED |
| 413 | FSC1 | FROM THE POSSIBLE FREQUENCIES THAT DO NOT VIOLATE C/I OR FREQUENCY SEPARATION CONSTRAINTS CHOOSE THE LOWEST FREQUENCY |
| FREQUENCY SELECTION CRITERIA (FSC) 420 | FSC2 | • FROM THE POSSIBLE FREQUENCIES THAT DO NOT VIOLATE C/I OR FREQUENCY SEPARATION CONSTRAINTS CHOOSE THE FREQUENCY WITH THE HIGHEST C/I <br> • IF THERE IS A TIE, WHICH OCCURS FREQUENTLY IN THE BEGINNING OF AN ITERATION, THEN CHOOSE THE FREQUENCY THAT IS USED LEAST OFTEN |
| | FSC3 | • FOR EACH OF THE POSSIBLE FREQUENCIES THAT DO NOT VIOLATE C/I OR FREQUENCY SEPARATION CONSTRAINTS ASSUME IT IS ASSIGNED AND COMPUTE <br>  • # AVAILABLE FREQUENCIES/( NEEDED + BIAS ) USING THE SSC2 DEFINITION OF THE AVAILABLE FREQUENCY FOR EACH BASE STATION <br>  • THE DIFFERENCE BETWEEN THIS VALUE AND THE CURRENT VALUE FOR EACH BASE STATION <br>  • THE SUM OF THESE DIFFERENCES OVER ALL BASE STATIONS <br> • PICK THE FREQUENCY THAT HAS THE SMALLEST VALUE OF THIS SUM. THIS SUM IS A FIGURE OF MERIT FOR THE COST OF THE FREQUENCY ASSIGNMENT |

FROM 420
FIG. 20A

| | | |
|---|---|---|
| CRITERIA ADJUSTMENT 422 | CA | • IF THE SECTOR HAD AVAILABLE FREQUENCIES WHEN THE LAST ASSIGNMENT WAS MADE FOR THE SECTOR DURING THE ITERATION THEN ADJUST THE BIAS IN THE SECTOR SELECTION CRITERION DOWNWARD BY THE NUMBER OF AVAILABLE FREQUENCIES WHEN THE LAST ASSIGNMENT FOR THE SECTOR WAS MADE<br>• IF THE SECTOR STILL HAD NEEDED FREQUENCIES WHEN THE ITERATION TERMINATED ADJUST THE BIAS IN SECTOR SELECTION CRITERION INCREMENTALLY UPWARD BY THE NUMBER OF NEEDED FREQUENCIES FOR THE SECTOR<br>• SCALE THE INCREMENTAL DOWNWARD BIASES FOR THE SECTORS BY AN AMOUNT THAT ENSURES THAT THE TOTAL DOWNWARD BIAS IS EQUAL TO THE TOTAL UPWARD BIAS OVER ALL SECTORS<br>• SCALE THE ALL INCREMENTAL BIASES FOR EACH SECTOR BY A SCALE FACTOR THAT IS INITIALIZED TO 1 AND GETS INCREMENTED BY 1 WHEN THE NUMBER OF ITERATIONS IS DIVISIBLE BY HALF OF THE NUMBER OF SECTORS BEING PLANNED |

| HEURISTIC DECISION CATEGORY | LABEL | DESCRIPTION |
|---|---|---|
| SECTOR SELECTION CRITERIA 430 | SSC3 | • SAME AS SSC1 EXCEPT RULE OUT SECTORS AS BEING CANDIDATES IF<br>  • THE SECTOR HAS ASSIGNMENTS UP TO ITS ALLOWABLE NUMBER OF DESIRED SHORTAGES AND<br>  • AT LEAST ONE OF THE SECTORS BEING PLANNED HAS BOTH AVAILABLE FREQUENCIES AND MORE SHORTAGES THAN DESIRED |
| | SSC4 | • SAME AS SSC3 BUT REPLACE 'SSC1' WITH 'SSC2' |

FIG. 21

| COMPLEXITY OPTIONS | SECTOR SELECTION CRITERION | FREQUENCY SELECTION CRITERION | RELATIVE SPEED GRANET 2.4 |
|---|---|---|---|
| 0 | SSC1 | FSC1 | BASELINE |
| 1 | SSC1 | FSC2 | X4.8 |
| 2 | SSC2 | FSC1 | X6.3 |
| 3 | SSC2 | FSC2 | X9.5 |
| 4 | SSC2 | FSC3 | X53 |

FIG. 22

METHODS AND TECHNIQUES IN CHANNEL ASSIGNMENT IN A CELLULAR NETWORK

REFERENCE TO RELATED APPLICATIONS

This application is a continuation of U.S. patent application Ser. No. 09/464,301 filed on Dec. 15, 1999, U.S. Pat. No. 6,871,073.

This application is related to U.S. patent application Ser. No. 09/461,990 filed on Dec. 15, 1999, U.S. Pat. No. 6,728,544.

The contents of all of these applications are explicitly incorporated by reference herein in their entireties.

BACKGROUND

1. Field of the Invention

This application generally relates to cellular networks, and more particularly to techniques for planning and tuning a cellular network.

2. Description of Related Art

Cellular networks may be used in a variety of applications. For example, cellular networks are used in cellular telephone communications. Cellular networks include, for example, digital and analog cellular networks that operate in accordance with one or more protocols or standards, such as Code Division Multiple Access (CDMA), Frequency Division Multiple Access (FDMA), IS-95, or Advanced Mobile Phone Service (AMPS). Generally, cellular networks are configured prior to operation in accordance with certain quality standards, conditions and constraints. Examples of the foregoing include., minimizing interference to base stations or sectors. Additionally, the FCC defines frequency ranges that may be assigned and used for transmissions in cellular networks. A base station may be defined as including one or more sectors. Each sector may be viewed as a point from which, or through which transmissions within the cellular network may be made.

One problem with cellular networks is how to configure the cellular network having multiple sectors, and assigning or associating channels or frequencies with each of these sectors. In other words, part of the configuration of the cellular network is defining at what frequencies different sectors may operate. Sectors may be assigned channels related to information transmissions, such as cellular telephone calls, as well as particular ones for communications related to transmission set up. This association of one or more of one or more channels or frequencies with each of the sectors is determined prior to operation of the cellular network. Additionally, only certain ranges may be used as defined, for example, in accordance with FCC regulations. The FCC defines bands of frequencies that include a limited number of channels which are divided among the various sectors within the cellular network for transmissions.

In a heavily loaded cellular system, the limited number of frequencies or channels may be a problem. One solution is to reuse certain frequencies and assign the same frequency or channel to more than one sector. However, reusing channels when configuring the cellular network may cause the task of system configuration to become increasingly complex due to the constraints that are considered in system configuration. For example, two sectors which are adjacent may generally not be assigned the same frequency due to the extensive interference and operational problems that may be introduced.

Consequently, part of the process of configuring a cellular network may include determining what frequencies may be reassigned to which sectors while trying to minimize the interference which may be introduced by having multiple sectors or base-stations operating at the same frequency. Determining which frequencies may be reassigned or associated with multiple sectors is considered in accordance with quality of service standards, for example, such that a signal is transmitted at a certain power with minimal interference.

Thus, there is required a technique for configuring a cellular network in accordance with input configurations constraints as well as quality of service constraints to achieve a high degree of quality signals by minimizing the interference in a specific set of output configuration data.

SUMMARY OF THE INVENTION

In accordance with principles of the invention, disclosed is a method and computer program product for determining channel assignments for a cellular network. Requested channel assignments are determined. A sector is selected in accordance with sector selection criteria. A channel is selected in accordance with frequency selection criteria. It is determined if an additional requested channel assignment may be filled in accordance with predetermined criteria. A value included in one of the sector or frequency selection criteria is adjusted if all requested channel assignments have not been filled.

In accordance with yet another aspect of the invention is a method and computer program product for determining a channel assignment for a cellular network. A sector is selected in accordance with sector selection criteria. A minimum channel threshold is determined and associated with each sector identifying a minimum quality of acceptable channel assignments.

In accordance with yet another aspect of the invention is a method and computer program product for determining color codes. A channel is selected. Sectors associated with the channel are identified. A channel assignment technique is used to assign color codes to sectors using the channel.

BRIEF DESCRIPTION OF THE DRAWINGS

Features and advantages of the present invention will become more apparent from the following detailed description of exemplary embodiment thereof taken in conjunction with the accompanying drawings in which:

FIG. 8 is an example of an embodiment of a best server map;

FIGS. 20A, 20B are an example of an embodiment of a table including various selection and adjustment criteria.

FIG. 21 is an example of an embodiment of additional selection criteria stored in a table;

FIG. 22 is an example of an embodiment of a table representing various levels of complexity options in accordance with different selection criteria.

DETAILED DESCRIPTION OF PREFERRED EMBODIMENT

Figure 1:
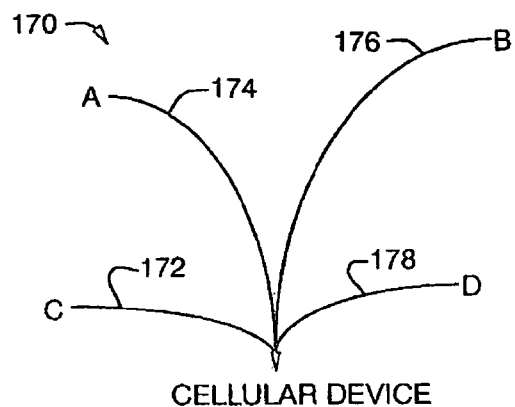
FIG. 1 is an example of an embodiment of a cellular network when a cellular device is turned on initially.

Referring now to FIG. 1, shown is an example of an embodiment of a system of a cellular network. The system 170 includes four sectors or base stations A, B, C and D. Shown in FIG. 1 is the operation of transmission within the system 170 when a cellular device is turned on. The signals 172, 174, 176 and 178 are transmitted by each of the sectors or base stations to the cellular device. Generally, the cellular device turns on and "listens" for signals 172-178 as transmitted from each of the sectors.

It should be noted that the cellular device may include, for example, a cellular telephone or other device which transmits signals in a cellular network. Each of the sectors A through D have stations that operate within the cellular network 174 for transmissions between the cellular device and the sectors, such as making telephone calls from a cellular telephone.

It should be noted that other embodiments of a system 170 may include more base stations and sectors, as well as include multiple cellular devices in operation. The system of FIG. 1 is shown for simplicity as including only four sectors and a single cellular device in operation.

Figure 2:
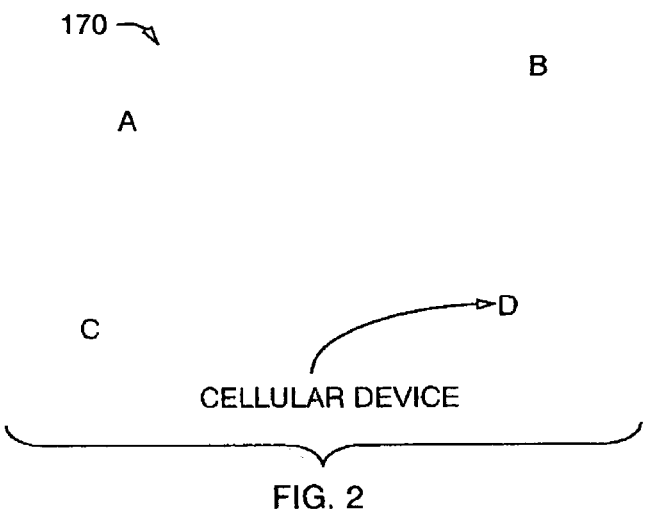
FIG. 2 is an example of the system of FIG. 1 when the cellular device selects a sector for a transmission.

Referring now to FIG. 2, shown is a "snapshot" of the system 170 after a cellular device is turned on and listens to signals from sectors A through D. Once the cellular devices receives a signal from each of the sectors, the cellular device selects one of the sectors for handling its transmission. As shown in FIG. 2, this selection is performed by the cellular device transmitting a signal to one of the sectors. In one embodiment, the selection may be based in accordance with the strength of the signals sent from each of the sectors. The cellular device may, for example, select the sector having the strongest signal transmission as detected by the cellular device.

Figure 3:
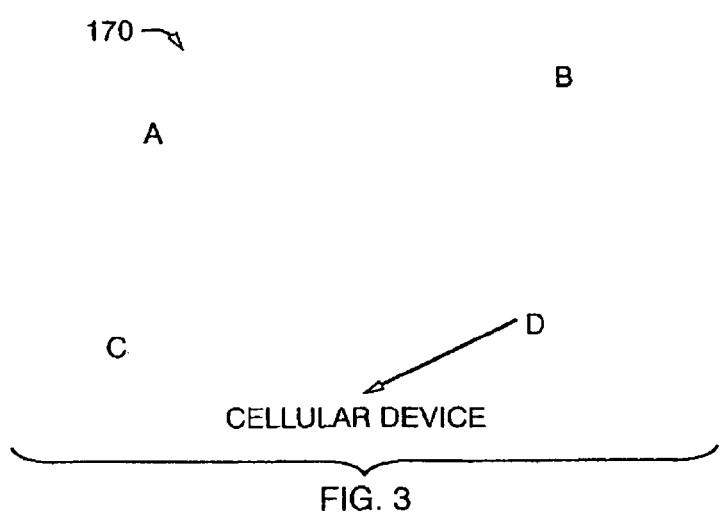
FIG. 3 is an example of the system of FIG. 1 when a cellular device is notified of the selected channel for the transmission.

Referring now to FIG. 3, shown is an example of an embodiment of system 170 with the cellular device being notified by the selected sector of the selected channel assignment for transmissions between the cellular device and the sector. The sector chooses one of the assigned frequencies or channels associated with the selected sector. These channels associated with each sector may be predetermined in accordance with criteria prior to operation of the cellular network 170. The sector communicates to the cellular device as to the selected channel for use in transmitting signals to and from the cellular device.

It should be noted that the embodiment of the system 170 in FIGS. 1 through 3 is an example of a communications or transmission protocol that may be used in communicating with a cellular device. It should be noted that prior to operation as in performing the signal transmissions between the base stations or sectors and a cellular device in operation, the system 170 must be properly configured in accordance with selected sets of channel assignments or frequencies. In particular, each of the base stations A, B, C and D are associated with a set of frequencies or channels which may be assigned or used when transmitting to and from a cellular device as indicated in the system of FIGS. 1 through 3 when a cellular device is in operation.

As known to those skilled in the art, the FCC defines certain channels or frequencies that may be assigned or used in transmissions within a cellular network. There is a relatively small number of channels or frequencies that may be assigned. Thus, part of the problem of configuring the system 170 includes how to divide the different channels that are used within the cellular network. Various tools, such as GRANET ("Graphical Radio Network Engineer Tool") as used by GTE Corporation may be used to configure and tune cellular systems, such as the system 170 of FIGS. 1-3.

What will be described in paragraphs that follow are techniques for tuning and configuring this system in accordance with certain input data and criteria or constraints. For example, the constraints may relate to quality of service, such as requiring information transmissions to be of a certain power level. Various input configuration information, such as the geographic constraints, is also considered when doing channel assignments and information transmissions. It should be noted that other constraints and input may be considered as known to those skilled in the art, for example population, in a particular area. Population may be an indicator of the number of channel assignments required for a particular sector.

Figure 4A:
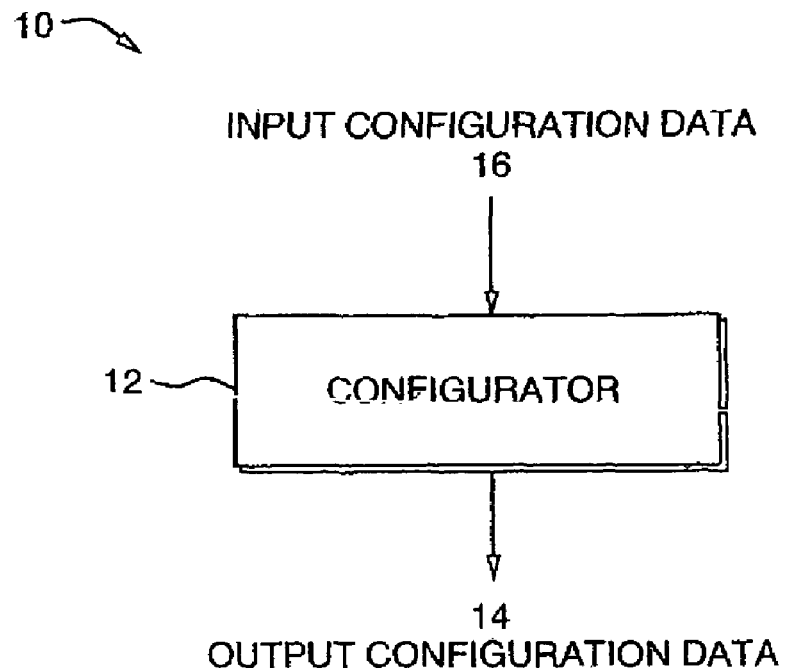
FIG. 4A is an example of an embodiment of a system that may be used to configure a cellular network.

Referring now to FIG. 4A, shown is an example of an embodiment of a system 10 that may be used to configure the cellular network 170 of FIG. 1. The system 10 includes input configuration data 16 which is input to a configurator 12 producing output configuration data 14. The input configuration data, as previously described, may include constraints of a particular system, as well as quality of service (QOS) parameters or requirements. This will be described in more detail in paragraphs that follow. Given a particular set of input configuration data, the configurator 212 produces an output configuration data set 14. Generally, the output configuration data 14 is that information which is needed to configure the particular sectors such as those A through D in the system 170 operating in the cellular network. In particular, the output configuration data includes one or more channels selected and associated with a particular sector. As previously described, these channel assignments or frequencies are those which may be used by the various sectors in transmissions between a cellular device operating within a cellular network 170.

Figure 4B:
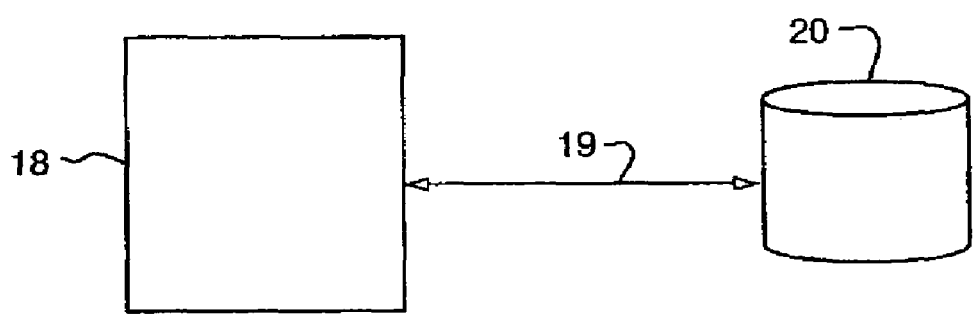
FIG. 4B is an example of an embodiment of a computer system as may be used to produce portions of a cellular network configuration tool.

Referring now to FIG. 4B, shown is an example of an embodiment of a system which may be used in producing a configuration for the cellular network 170 of FIG. 1. In this particular embodiment, the configurator 12 as well as the input configuration data 16 and output configuration data 14 may reside on a storage device 20 connected by connection 19 to computer system 18. The computer system 18 may be any commercially available processor such as an Intel based personal computer or other commercially available computer system in accordance with each particular implementation. The communication connection 19 may be a network connection or other type of connection between a storage device 20 and a computer system 18 upon which a configuration 12 may be executed to produced the output configuration data 14. It should be noted that portions of the configuration 12 which should be described in paragraphs that follow may be implemented in software and/or hardware. Those particular portions which are software may be located and stored in a storage device such as 20 and transferred for execution to computer system 18 through connection 19. A variety of different types of connections 19 are known to those skilled in the art and may vary with each particular embodiment.

It should also be noted that, similar to the variety of network connections and computer systems that may be used in a particular embodiment, a variety of data storage devices 20 may be included in the particular embodiment as known to those skilled in the art.

Figure 5:
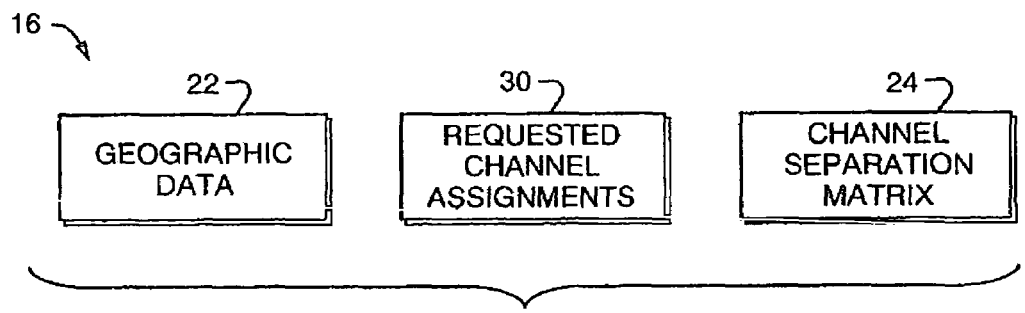
FIG. 5 is an example of an embodiment of the input configuration data.

Referring now to FIG. 5, shown is an example of an embodiment of different classifications of input configuration data 16. Input configuration data 16 includes geographic data 22, with requested channel assignments 30, and the channel separation matrix 24. Generally, the geographic data 22 may include a variety of information describing the geographic locale, such as the terrain of an area, which may be used in propagation modeling, as well as particular antenna characteristics as used in operation within a particular sector. Additionally, input information related to geography may include information about population as well as various land characteristics. In this particular embodiment, the geographic data includes base station or sector location information, such as longitude and latitude and tower height. Also included in the geographic data is a representation of the contour of the land, for example, in the form of raster maps. Additionally, geographic data may include information regarding the elevation of the land as well as land use and cover, such as whether a particular area is residential, an orchard, or over water.

Generally speaking, the input configuration data includes that input information which may be relevant to a particular embodiment and should be considered when determining the configuration of the cellular network. Requested channel assignments 30 is basically a request of the number of frequencies or channels to be associated with each particular base station or sector. Generally, channel assignments may be determined for example by estimation using the population information or it may be alternatively be based on past use. It should be noted that the types of information included in each of the foregoing may vary with embodiment in accordance with each particular application and implementation.

The channel separation matrix 24 is a representation of the minimum channel separation between any two base stations or sectors. In this particular embodiment in the channel separation matrix 24, an N×N dimensioned matrix may be used. In this embodiment there are N base stations or sectors. Each entry in the matrix represents the minimum channel separations between the two sectors as indicated by, respectively, a particular row and column pair. Typical entries in the matrix are one of a 0, 1 or a 2. A channel separation of 0 indicates there is no separation between frequencies or channels that may be assigned to particular base stations. A 1 indicates that there must be at least a plus or a minus of 1 channel difference in assignments between two particular sectors. Similarly, a 2 indicates that no adjacent sectors may be assigned the same frequency or channel.

Generally, the term "neighbor" is used to describe how one sector and its base stations relates to another sector and its base stations. It is generally known in the art that if a call may be "handed off" to a sector from another sector, those two sectors may qualify as neighbors. With regard to the channel separation matrix, a neighbor may be reflected in the channel separation matrix by a minimum separation of 2 indicated between a pair of sectors or base stations.

Figure 6:
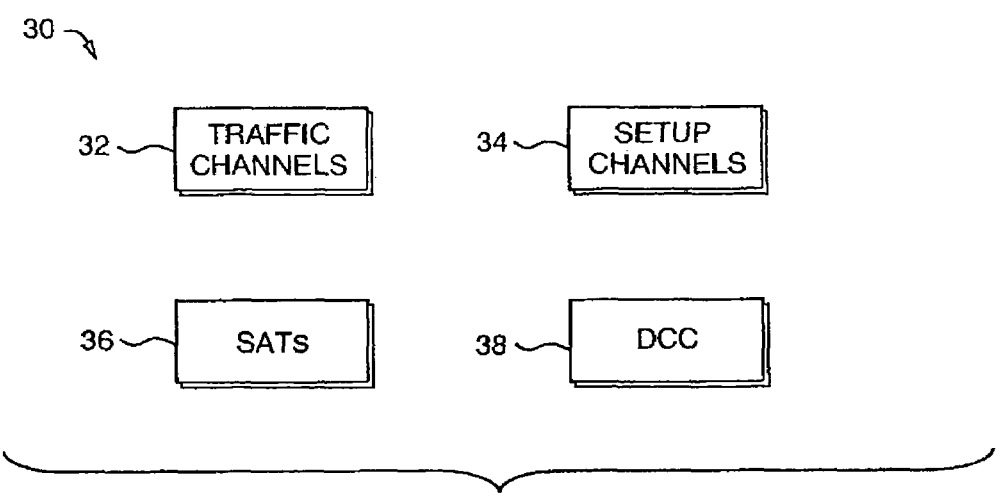
FIG. 6 is an example of the partitioning of channel assignments.

Referring now to FIG. 6, shown is an example of an embodiment of the four sets of channel assignments that may be performed within an embodiment of the system of the cellular network 170. In other words, the configurator tool 12 may be used to select particular channels or frequencies and accordingly associate them with different sectors. For example, in AMPS, the four sets of channel assignments include traffic channels 32, set-up channels 34, Supervisor Audio Tones (SATs) 36, and Digital Color Codes (DCC) 38.

Generally, traffic channels 32 are those channels or frequencies assigned or associated to a particular sector for transmissions when in operation. These channels may generally be described as operation transmission frequencies, for example, those frequencies that may be used in information transmissions between a cellular device and a sector during transmission of a cellular telephone call. Set-up channels 34 are those channels each associated with a sector at which the sector may operate to set-up an initial communication with a cellular device. For example, referring to FIG. 1, each of the transmissions 172 through 178 operate at a particular set up frequency or channel associated with each of the base stations A through D. Generally, the techniques that will be described to configure the traffic channel calls may also be used to configure the set-up channels.

The SATs are generally an assignment of one of three particular tones associated with each frequency or channel assigned, and assist with the identification of a particular base station or sector. The DCCs relate to the set-up channels between a base station and a handset or cellular device. The DCC is two bits of information assigned to each set-up channel and placed into in the transmission stream.

Figure 7:
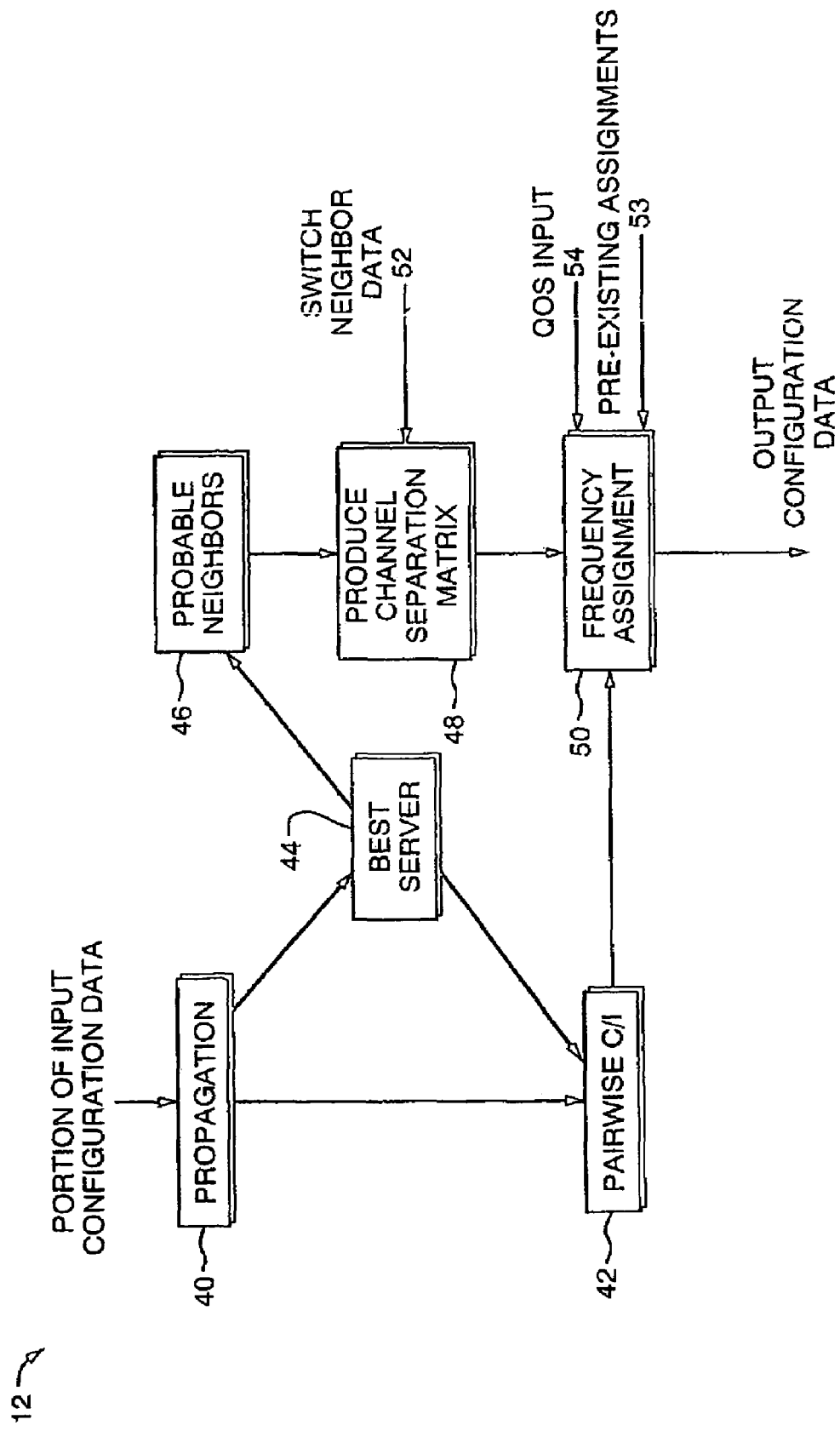
FIG. 7 is an example of the embodiment of the configurator of FIG. 4.

Referring now to FIG. 7, shown is an example of an embodiment of the configurator 212 of FIG. 4. Generally, FIG. 7 shows a flow diagram of the various components and how they operate and interact within the configurator 212. This embodiment of the configurator 212 includes a propagation module 40, a pairwise C/I module 42, a best server module 44, a probable neighbors module 46, a channel separation matrix module 48, and a frequency assignment module 50. Input to the propagation module includes a portion of the input configuration data, such as geographic data. Generally, the propagation module 40 determines how strong a signal from a sector, or base station from within a sector, is from any place in a region. This propagation or signal strength is used to compute path loss. Information regarding signal strength is input to the best server module 44 and the pairwise C/I module 42. This best server module 44 may determine the best server regions for the operation of the cellular network. In other words, the best server module 44 determines which base stations or sectors may best handle an incoming call or transmission in accordance with the signal strength as determined by the propagation module 40.

The best server region indicates for a particular area what base station or sector is best suited to handle or serve calls from that particular region. The best server region module 44 is used to determine the best sector to serve or handle an incoming call in accordance with signal strength. The pairwise C/I module 42 performs determinations in accordance with hypothetical or simulated conditions, e.g., a "what if" scenario, that are considered when assigning frequencies or channels. The pairwise C/I module 42 determines the strength of a signal transmitted at a frequency if sectors A and B are both assigned the same frequency and if no other frequencies are assigned. Generally, the pairwise C/I considers what the strength of a signal from a first sector operating in a first frequency or channel in conjunction with the interference generated by a second sector also operating at that same frequency or channel. Generally, the pairwise C/I considers the hypothetical situation in this assignment as a condition in determining whether to perform a certain frequency assignment as an input to the frequency assignment module 50. Determining frequency assignments from the pairwise C/I module 42 is used by looking at each point in a best server region and considering the strength of the desired or carrier signal as well as the strength of the interference. This will be described in more detail in paragraphs that follow. It should generally be noted that the pairwise C/I requirements produced by the pairwise C/I module 42 in considering frequency assignments relate to quality of service. In other words, the pairwise C/I module 42 produces hypothetically input in accordance with a particular channel assignment configuration. This may generally be viewed as an estimation of interference as related to a particular frequency assignment. This is considered as an input to the frequency assignment module 50 in conjunction with the quality of service input 54 which dictates, for example, quality of service required for a particular system configuration. The pairwise C/I module 42 considers the interference components for hypothetical pairs of frequency assignments.

Output produced by the best server module 44 is also input to the probable neighbors module 46. Generally, the probable neighbors module 46 may be used to produce input to determine what two sectors are, or may be considered, "neighbors". This is used as input in producing the channel separation matrix by the channel separation module 48. Additionally, switch neighbor data 52 may also serve as an input in producing the channel separation matrix by module 48. Generally, switch neighbor data is a snapshot of the channel separation as known to the existing switching systems as may be included in an embodiment of the system 170 of FIG. 1. It should be noted that both actual switch neighbor data 52 as well as output from the probable neighbors module 46 may serve as input to the module 48 in producing the channel separation matrix. The switch neighbor data 52 represents the actual description of what sectors are considered neighbors by the switches currently in operation. However, it is often the case that an embodiment may want to add sectors or base stations. Thus, performing using the actual switch neighbor data 52 does not suffice to accurately describe the neighbor relationship between all sectors in this instance. For example, where an additional base station or sector is to be added, input for this future configuration may come from the probable neighbors module 46 and serve as input for module 48 to produce the channel separation matrix as previously described.

In this embodiment, the channel separation matrix may include information as will be described below. Generally, two sectors have a minimum separation of 2 if a call can be "passed off" between the two sectors, qualifying the two sectors as neighbors. If two sectors have the same neighbor, for example sectors C and D may have a common neighbor A, then C and D have a separation of 1 as may be indicated in the channel separation matrix. Otherwise, a zero (0) is indicated as an entry in the channel separation matrix by the switch neighbor data 52. A channel separation matrix may be used as an input to the frequency assignment module 50. Generally, the frequency assignment module 50 takes into account those sectors which are neighbors as well as hypothetical interference in accordance with a particular frequency assignment. The frequency assignment module 50 uses this information to produce a configuration of channel assignments associated with each particular sector, for example, in producing the traffic channel assignment set 32.

Additionally, threshold tests may be made in accordance with QOS input 54 such that a particular configuration operates in accordance with predetermined QOS requirements 54. The frequency assignment module 50 outputs configuration data, for example, such as traffic channel configuration information 32 of FIG. 6 which associate each particular sector with one or more frequency or channels for transmissions. Each of the components for the system 12 of FIG. 7 will be described in more paragraphs that follow.

Referring now to FIG. 8, shown is an example of an embodiment of the best server map. The best server map 100 in FIG. 8 includes information about what is the best server for handling a particular call in a region within the cellular network. The representation of the best server map 100 includes a cell associated a particular portion of geographic area. For example, in the best server map 100, a global geographic area is associated with cell 2 for which sector A is indicated as the best server. Similarly, sector A is indicated as the best server associated with the geographic area of cell 17. However, sector B is indicated as the best server for the geographic area associated with cell 3, 4 and 18. It should be noted that some particular geographic areas, such as indicated by geographic area 20, in this representation with an X has no best server associated with that particular geographic location.

It should also be noted that indication of the same best server may be scattered throughout the best server map. In other words, there are areas or portions of the best server map which may not be contiguous in representing those portions for which A, B C, or D are the best servers. For example, note that cell number 5 contains an A and cell numbers 3 and 4 contains B's. Thus, those geographic areas associated with cell number 5 indicate A is the best server. However, this is separate from, and not contiguous with, that portion of the map defined by 110 which includes a block or group of cells shown in the left portion of the map 100. In particular, the area 110 represents a contiguous portion of the best server map for which A has been designated the best server. This portion 110 is disjoint and separate from other single cells, such as cell number 5 and cell number 27 that also indicate A as the best server.

Generally, such disjoint representations may occur, for example, due to various geographic details such water, land or particular urban areas. For certain geographic locations such as those with certain elevation or mountainous terrains, there may be disjoint best server groupings or gaps between those geographic areas associated with the same best server.

Figure 9:
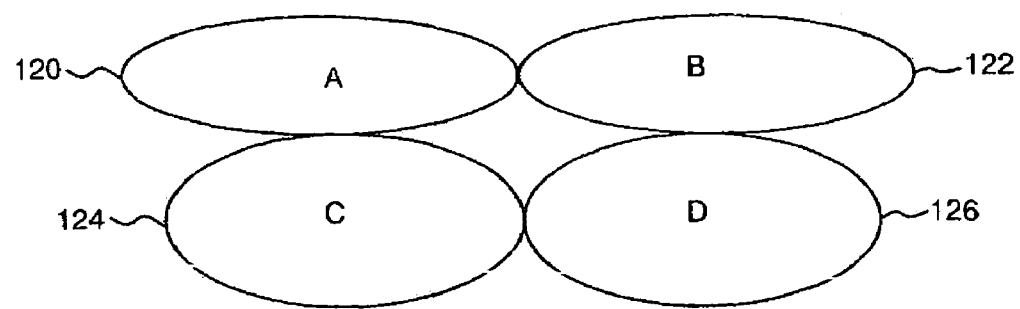
FIG. 9 is an example of an embodiment of the representation of the best server regions.

Referring to FIG. 9, shown is an example of a pictorial representation of the best server regions. The best server regions for each of the sectors or base stations A through D are indicated respectively by the circular regions 120 through 126. It should be noted that this representation indicates only contiguous areas in a smooth fashion. However, as previously discussed in conjunction with FIG. 8, it is often the case that best server regions are not representable in such graphic representation as ideally given in FIG. 9, for example, due to the disjoint best servers regions associated with a particular geographic location.

Figure 10:
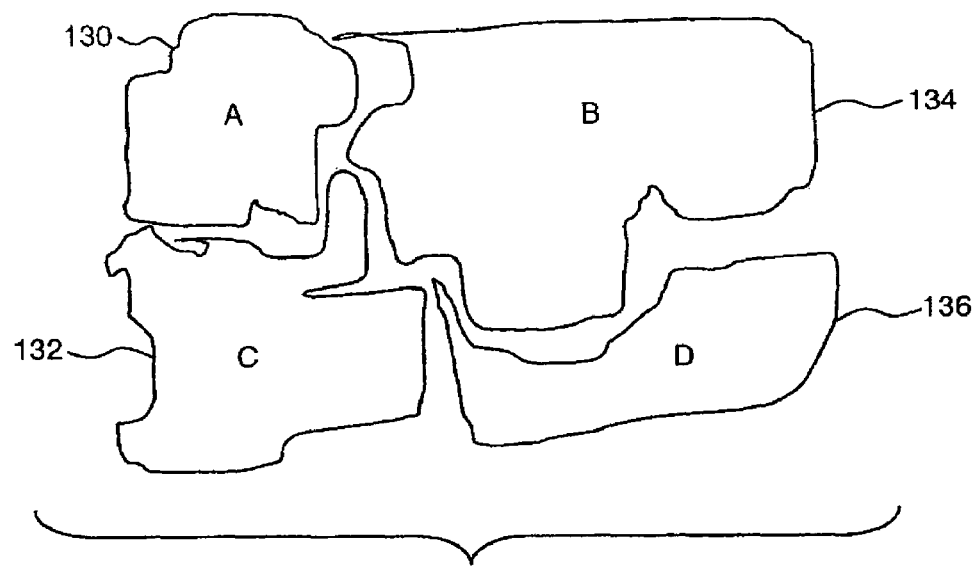
FIG. 10 is another example of an embodiment of the representation of the best server regions.

Referring to FIG. 10, shown is another example of a pictorial representation of the best server region associated with each of the sectors A through D as included in the system 170 of FIG. 1. Note the difference between the regions 130 through 136, respectively, with those regions indicated by 120 through 126.

Figure 11:
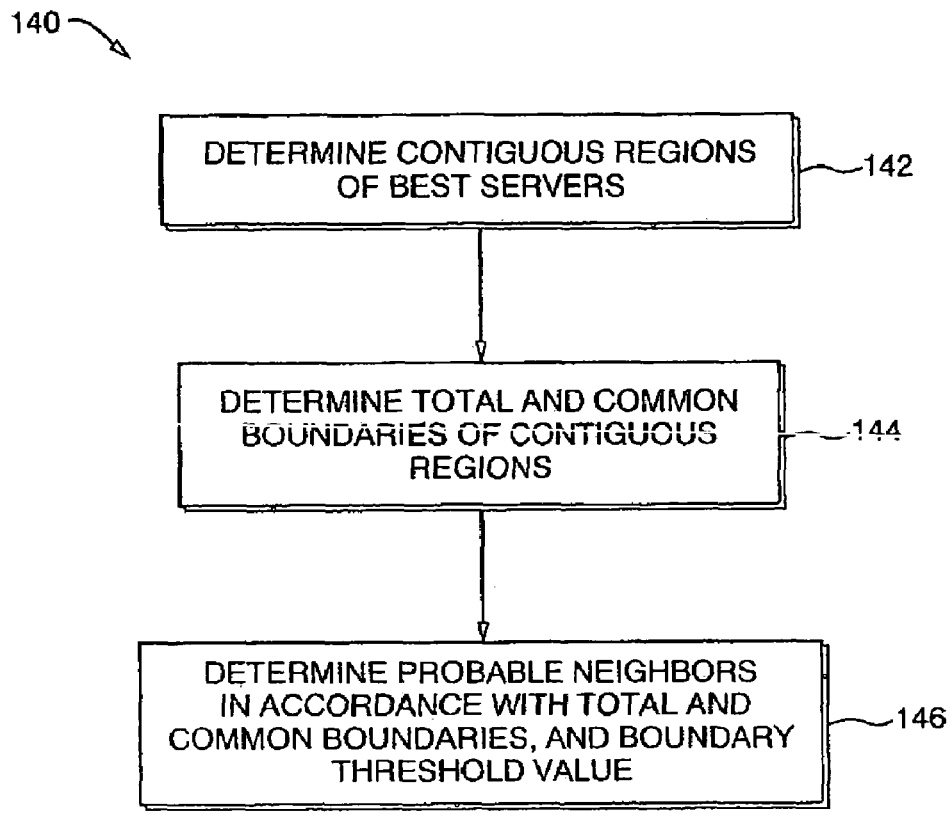
FIG. 11 is an example of an embodiment of a flowchart of a method of how to determine probable neighbors.

Referring to FIG. 11, show is an example of flowchart of the methods steps for determining probable neighbors. Generally, the method steps of FIG. 11 in flowchart 140 are those that may be performed by the probable neighbors module 46 in determining which pairs of sectors are probable neighbors. As previously described, the probable neighbors module 46 implements a technique which is intended to be used when the switch data 52 may be unavailable or out of date for a particular sector being considered. As previously described also, this may be used as an alternative, for example, when a new sector is being added for which there is currently no active switch data 52 available.

At step 142, the contiguous regions of the best servers are determined. As previously described in conjunction with FIG. 8, in this embodiment the best server map is examined to determine which portions are contiguous within the map indicating a contiguous region or geographic area for which a common best server has been indicated. This may be indicated for example by the graphical representation of portion 110 of map 100 which indicates A as the best server for the associated geographic area.

At step 144, the total and common boundaries of the contiguous regions are determined. In other words, the total boundary for a particular contiguous region such as 110 is determined. This may be indicated, for example, by the darkened line surrounding the portion 110 of map 100, indicating the total boundary for this contiguous region. Also determined at step 144 is that portion of the boundary which is common between two contiguous regions in which each contiguous indicates a different server. In this example, line 111 indicates a common boundary for example between the contiguous area 110 and another contiguous area which has not been defined and determined in the best server map 100.

At step 146, probable neighbors are determined in accordance with total and common boundaries as well as a predetermined boundary threshold value. What will now be described in paragraphs that follow are more detailed descriptions for the steps of the flow chart 140 of FIG. 11.

Figure 12:
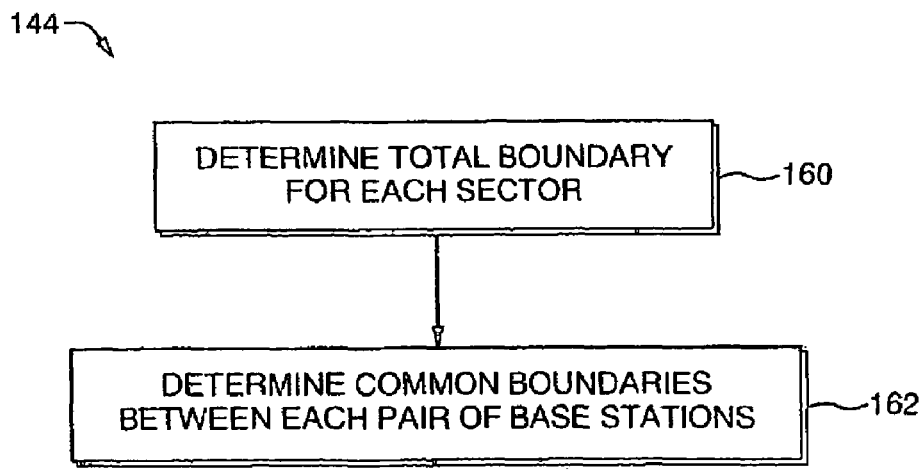
FIG. 12 is an example of an embodiment of a flowchart of the method steps for determining total and common boundaries for contiguous regions.

Referring now to FIG. 12, shown is a flowchart of an embodiment of a more detailed step 144 for determining total and common boundaries of contiguous regions. At step 160, the total boundary is determined for each sector. In other words, at step 160, a total boundary or quantitative representation is determined representing the boundary conditions for each sector as indicated in the best server map 100. At step 162, the common boundaries between each pair of sectors are determined.

Figure 13:
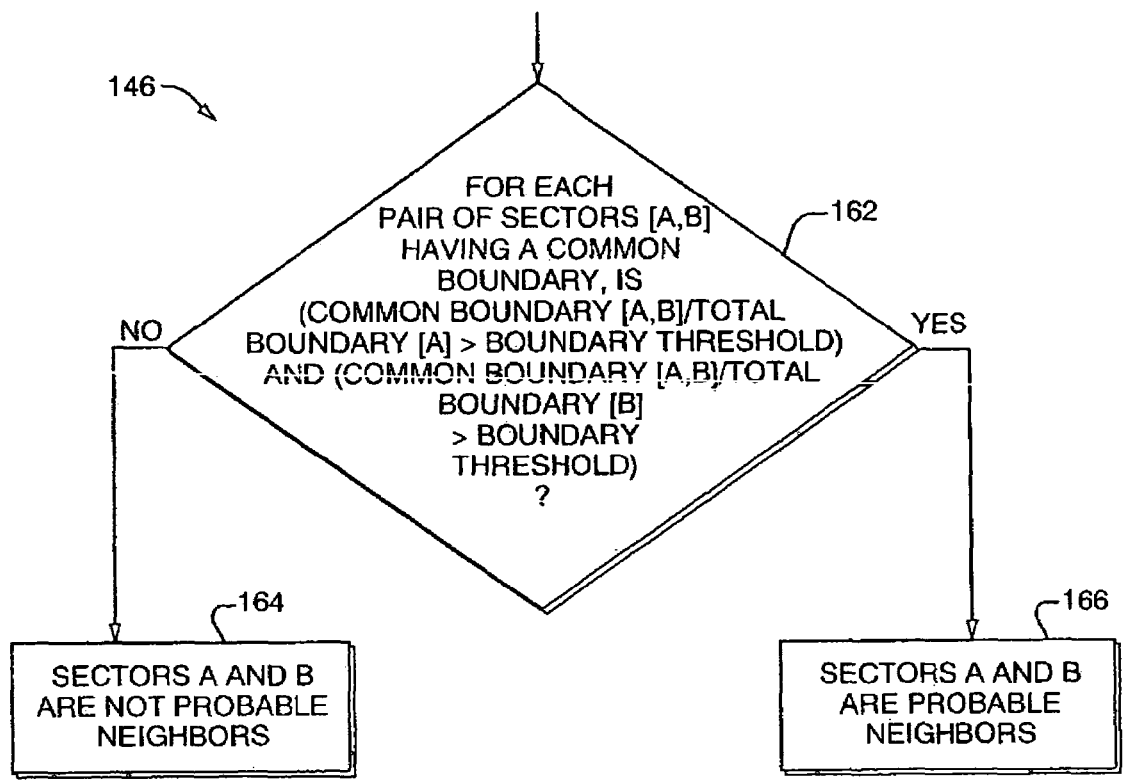
FIG. 13 is an example of an embodiment of a flowchart of determining probable neighbors in accordance with total and common boundaries and a boundary threshold.

Referring now to FIG. 13, a flowchart is shown to include more detailed steps for determining probable neighbors in accordance with total and common boundaries as well as a predetermined boundary threshold value as indicated in step 146 of the flowchart 140. At step 162, it is determined for each pair of sectors A and B having a common boundary the ratio or percentage of common sector boundary to total sector boundary. In other words, a percentage is arrived at with the numerator as the common sector boundary over the total sector boundary for each pair of sectors A and B. In one particular embodiment, the total sector boundary may be either the total sector boundary regarding best server A or the total sector boundary regarding best server B. One embodiment may consider the minimum of the total sector boundary of either A or B. Another embodiment may take the maximum of the total sector boundary of either A or B. Other embodiments may use other values in the ratio. At step 162, a decision is made comparing each of these percentages or ratios for a pair of sectors having a common boundary to a predetermined boundary threshold.

At step 162, it is determined for each pair of sectors A and B having a common boundary, is the common boundary or percentage of the common boundary to the total boundary greater than some threshold for both the total boundaries of A and B. If it is determined at step 162 that such a condition is true, control proceeds to step 166 where it is determined that sectors A and B are probable neighbors due to the large percentage of common boundaries shared between the two sectors indicated by the pair A and B. If it is determined at step 162 that the portion of common boundary between A and B is less than or equal to the boundary threshold for both the total boundaries of A and B, control proceeds to step 164 where it is determined that sectors A and B are not probable neighbors.

Included below is a pseudo code representation of an implementation of the probable neighbors technique generally described in the flowcharts of FIGS. 11 through 13.

Prior to setting forth this pseudo code description, certain assumptions and data representations will now be described. The array best_server [place] is a representation of a best server for any pixel. Generally, the array best_server contains an identifier for the sector determined to be the best server associated with particular places indicated by the index into the array. It is assumed that a function not_a_best_server (place) returns a value of true when the corresponding pixel is not a best server as indicated by the parameter place. Similarly, it is assumed in the pseudo code description that a function over_water (place) returns a value of true when the corresponding pixel is over water. Such pixels are ignored in the probable neighbors calculation. The functions find_row (place) and find_col (place) return the row and column respectively at any pixel. The function find_pixel (row, col) returns a pixel given a particular row and column. The use of pixels in this particular example are thought of as components of a raster scan representing the geographic area. This representation in a raster type of image is a convenience rather than a necessity in using the techniques of this. Pixels may be scanned from map_start to map_end. Each row has a row_start and a row_end. Each column has a col_start and a col_end. A local array pixel_flag [place] is given values of sector identifiers. These include special values of IGNORE, UNPROCESSED and PROCESSED that are distinguishable from all sector identifiers and each other. Sectors may be scanned in order from first_sector to last_sector. Probable neighbors may be returned in a matrix as indicted in the pseudo code as neighbor_matrix with a 2 dimensional index [sector A, sector B]. The neighbor_matrix contains an entry of 1 if the corresponding pair are probable neighbors and an entry of 0 otherwise. A temporary stack is assumed to be available for pixels using the foregoing techniques to find and mark fragments including checking for and protecting against stack overflows.

Included below is the PROBABLE_NEIGHBORS pseudo code.

```
PROBABLE NEIGHBORS( )
/*
* Set small gap threshold
*/
boundary_width = 200m      /* default value for gap threshold */
width = max( (floor(boundary_width/unit_x) + 1/2), 1) /* convert to
pixels */
/*
* Set "common boundary threshold
*/
boundary_fraction = 05     /* define default threshold for "common
                             boundary" */
/*
* Initialize
*/
for place = map_start to map_end   /* scan by pixels */
  if not_a_best_server (place) or over_water (place)
    pixel_flag[place] = IGNORE
  else
    pixel_flag[place] = UNPROCESSED
/*
* Find Largest contiguous region for each server
*/
for place = map_start to map_end
  if pixel_flag[place] = UNPROCESSED
    best = best_server[place]
    biggest_size = 0
    for new_place = place to map_end
      if(pixel_flag[new_place] = UNPROCESSED and
         best_server[new_place] = best)
/*
* Find all pixels contiguous with current one
*/
          size_fragment = find_fragment(new_place,best,width,
             pixel_flag)
          if biggest_size < size_fragment
            biggest_size = size_fragment
            biggest_place = new_place
/*
* Mark smaller fragments as seen/processed in largest contiguous region
*/
for new_place = place to map_end
  if pixel_flag[new_place] = PROCESSED
    if new_place = biggest_place
      flag = best /* mark biggest fragment by best server */
    else
      flag = IGNORE /*ignore other fragments */
    mark_fragment (new_place,best,width,pixel_flag,flag)
/*
/* finding size of border
*/
for sector_a = first_sector to last_sector
/*
* Initialize
*/
```

```
for sector_b = first_sector to last_sector
    n_pixels[sector_a, sector_b] = 0
    neighbor_matrix[sector_a, sector_b] = 0
for place = map_start to map_end
  if pixel_flag[place] NOT_EQUAL IGNORE
    sector_a = pixel_flag[place]
/*
* conversion between pixels and rows and columns
*/
    row = find_row(place)
    col = find_colplace)
/*
* look to the east for counting pixels in the border
*/
    for other_col = col+1 to min (col+width_1, col_end)
      other_place = find_pixel(row,other_col)
      if pixel_flag[other_place] NOT_EQUAL IGNORE
        sector_b = pixel_flag[other_place]
/*
* boundary is found
*/
        if sector_a NOT_EQUAL sector_b
          n_pixels[sector_a, sector_b]++
/*
* look to the north for counting pixels in the border
*/
    for other_row = row+1 to min(row+width+1, row_end)
      other_place = find_pixel(other_row,col)
      if pixel_flag[other_place] NOT_EQUAL IGNORE
        sector_b = pixel_flag[other_place]
/*
* boundary is found
*/
        if sector_a NOT_EQUAL sector_b
          n_pixels[sector_a, sector_b] ++
/*
*Symmetrize counts and sums over border - if a-b is border, so is b-a
*/
for sector_a = first_sector to last_sector
  for sector_b = first_sector to last_sector
    if sector_a < sector_b
      n_pixels[sector_a, sector_b] = n_pixels[sector_a, sector_b] +
                                    n_pixels[sector_b, sector_a
      n_pixels[sector_b, sector_a] = n_pixels[sector_a, sector_b]
      if sector_a NOT_EQUAL sector_b
        n_pixels[sector_a, sector_a] = n_pixels[sector_a, sector_a] +
                                      n_pixels[sector_a, sector_b]
/*
* not neighbors of the border doesn't meet threshold requirements
*/
for sector_a = first_sector to last_sector
  for sector_b = sector_a+1 to last_sector
/*
* this implementation is conservative - total boundary threshold is the
* smallest total boundary
* length of base station/sector pair
*/
    boundary_length_threshold = max(boundary_fraction *
                             min(n_pixels[sector_a, sector_a],
                                 n_pixels[sector_b, sector_b])
    if n_pixels[sector_a, sector_b] >= boundary_length_threshold
      neighbor_matrix[sector_a, sector_b] = 1 /* A and B are
      neighbors == 1
      neighbor_matrix[sector_b, sector_a] = 1 /* they are neighbors == 1
/***********************************************************/
```

The foregoing pseudo code generally identifies a connected set of pixels for each best server. Sectors with neighboring sets of pixels are determined to be probable neighbors. In this embodiment, best server areas are notably fragmented at the pixel level. In particular, as previously discussed in conjunction with a best server map, a phenomenon that may be termed speckling may occur in which isolated pixels far from a sector have an indication of the same best server. This is in fact an artifact, for example, of small fluctuations in path loss estimation, and such isolated pixels may be excluded from probable neighbors calculation. In one embodiment, best server areas may be composed of a number of disconnected fragments each of which appears to the eye as a connected whole. For computation of contiguous regions, this may be formalized or taken into consideration. A fragment may be defined as a maximal set of piecewise connected pixels with the same best server. The pixel is in a fragment if and only if it is within the boundary width of at least one other pixel in the fragment. These fragments may be found by the find fragment function which will be described in more detail below. The point of the boundary in the probable neighbors in the probable neighbors pseudo code is to unify fragments which may be separated by insignificant gaps. As indicated in the pseudo code, the current default value for such a gap is 200 meters. Other values may also be used.

In order to consider in an embodiment the fact of widely scattered fragments which may introduce spurious probable neighbors, only the largest fragment for each best server is considered in the foregoing pseudo code. This is done by means of the MARK_FRAGMENT function which will also be described below.

Once a single fragment is identified for each best server, the number of neighboring pixels with all other best server fragments is counted. A neighboring pixel is one within the boundary along the east-west or north-south line. The point of the boundary in this particular example is to remove the effect of insignificant gaps. Best server regions with enough neighboring pixels are deemed probable neighbors. This count must be at least as large as a specified fraction of the largest possible count in accordance with the predefined threshold. In the foregoing description the default value or threshold is indicated at 5%.

Indicated below is the pseudo code for the FIND_FRAGMENT routine which is used by the probable neighbors pseudo code.

```
FIND_FRAGMENT(place, best, width, pixel_flag)
row_start = find_row(place)
/* push starting place onto the stack
push(place)
size = 1
while stack <> NULL
   new_place = pop( )
   row = find_row(new_place)
   col - find_col(new_place)
/* look within width of new_place for connected pixels, but not before
starting row
   for other_row = max(row-width, row_start) to min(row+width,
   row_end)
      for other_col = max(col-width, min_col) to min (col+width,
      col_end)
         other_place = find_pixel(other_row, other_col)
         if pixel_flag[other_place] = UNPROCESSED
            if best_server[other_place] = best
               pixel_flag[other_place] = PROCESSED
               push(other_place)
               size++
return(size)
/****************************************************/
```

The method or technique for finding fragments in best server areas is used in the probable neighbors pseudo code description and may be referred to as a flooding technique. For any pixel in a fragment, all adjoining pixels with the same best server are also made part of the same fragment. In this particular example, adjoining is defined as above within the boundary width. As each such pixel is found it is marked as being processed and pushed onto the stack. When a pixel is popped from the stack, adjoining unprocessed pixels are sought for it. The process stops when the stack is empty, indicating no more unprocessed neighboring pixels can be found. Additionally, FIND_FRAGMENT counts the number of pixels within the fragment so that the largest fragment may be subsequently identified as indicated in the probable neighbor pseudo code.

Included below is a pseudo code representation of the MARK_FRAGMENT routine which may be used in conjunction with the PROBABLE_NEIGHBORS and FIND_FRAGMENT pseudo code.

```
MARK_FRAGMENT(place, best, width, pixel_flag, flag)
row_start = find_row(place)
/* push starting place onto stack
push (place)
while stack <> NULL
   new_place = pop( )
   row = find_row(new_place)
   col = find_col(new_place)
/* look within the width of new_place for connected pixels but not before
starting row
   for other_row = max(row-width, row_start) to min(row+width,
   row-end)
      for other_col = max(col-width, min_col) to min(col+width,
      col_end)
         other_place = find_pixel(other_row, other_col)
         if pixel_flag[other_place] = PROCESSED
            if best_server[other_place] = best
               pixel_flag[other_place] = flag
               push(other_place)
```

It should be noted that a flooding technique as previously mentioned with FIND_FRAGMENT is also used to mark fragments in the MARK_FRAGMENT pseudo code pixel by pixel after the largest fragment is identified. That fragment is marked by the sector identifier for the best server. All other fragments are subsequently ignored. In the foregoing description of PROBABLE_NEIGHBORS, it should be noted that a threshold is established as a common boundary percentage. Additionally, a gap threshold is determined as indicated by the parameter with, both of these threshold conditions may be modified in accordance with each particular implementation or embodiment. Additionally, the foregoing implementation only considers the largest contiguous region for each server when determining neighboring sectors. It should also be noted that the foregoing pseudo code implementation of the general flow chart described in conjunction with FIGS. 11 through 13 takes a conservative approach when defining or determining whether two sectors are neighbors. This may be indicated by the threshold boundary_length_threshold where the threshold considers the smallest total boundary length for the base station or sectors in the pair. In the foregoing pseudo code description, this may be determined by taking the minimum of n pixels when computing boundary_length_threshold.

What will now be described are calculations involving the C/I statistics that may be computed, for example, by the pairwise C/I module 42 of FIG. 7. These calculations may be used, for example, in performing frequency assignments by the frequency assignment module 50.

The technique that will be described may be used in improving the accuracy of frequency assignments and channel assignments. Pairwise C/I values may be especially useful as a "figure of merit" for evaluating various frequency assignment scenarios, as may be performed in configuring the network 170. This figure of merit may be used to assess channel quality, and optimize the assignment for total interference requirements in accordance with quality service requirements, for example, as may be input to the channel assignment module.

As previously described, the pairwise C/I may be measured as the ratio of carrier power to interference power between two sectors using the same channel, or in other words, having the same channel assignment. Two pairwise C/I values exist for every pair of sectors A and B, where A is the carrier and B is the interferer, as well as where B is the carrier and A is the interferer. As will be described in paragraphs that follow, a data structure, such as a matrix, may be used to store C/I values and other associated data during the channel assignment process.

It should be noted that the interference as expressed in the C/I values may depend on such factors, for example, as coverage areas from the traffic distribution, and received power distribution. As will be described, it is assumed that measurements of power may be accurately modeled as having a lognormal distribution when the short distance fluctuations are averaged out. The power, as may expressed in decibels, is normally distributed with some predicted mean and standard deviation that are verified by measurements. Consequently, the C/I in decibels is the difference between two normal random variables with given means and standard deviations. Hence, the distribution of the C/I is normal. The mean is the difference between the mean carrier power and the mean interfering power. The standard deviation may be found by knowing the correlation co-efficient between the carrier power and the interfering power.

The statistical correlation that exists between the carrier power and the interfering power depends on the relative angle of arrival to the geographic areas being considered. Measurements may indicate that the correlation co-efficient, as will also be described, may be empirically estimated as a function of the magnitude of the angle between the paths to the point of interest in a coverage area. In this instance, the correlation co-efficient is a maximum of 0.9 at an angle of 0, and drops off linearly to 0 at a 180 degrees.

Once a C/I distribution is found at each point, the distribution is weighted proportionally to the estimated traffic for the area in the neighborhood of the point, and averaged over all the points covered by the carrier sectors coverage area. An overall distribution of C/I is thus formed. The pairwise C/I estimate may be defined as a percentile from this distribution, for example, the 10th percentile may be used.

Figure 14:
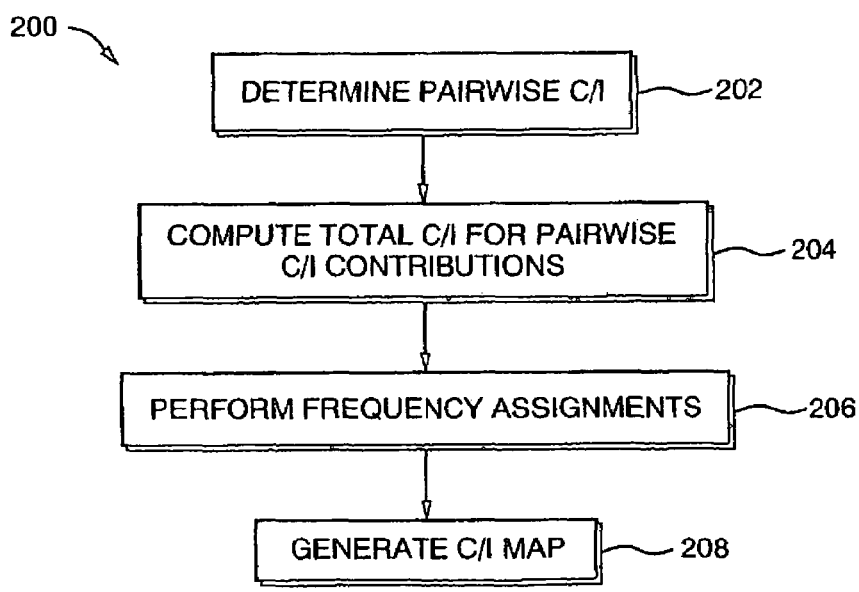
FIG. 14 is a flowchart of an example of an embodiment of steps of a method used in performing C/I calculations in frequency assignments.

Referring now to FIG. 14, shown is a flowchart of the method steps as may be used in computing and using C/I calculations in performing channel assignments. At step 202, pairwise C/I is determined for each pair of sectors. At step 204, the total C/I is computed for each of the pairwise C/I contributions. The total C/I may be expressed as a summation over pairwise C/I contributions. In this particular embodiment, two types of total C/I computations may be considered when performing step 204. These two types may be termed co-channel C/I and adjacent channel C/I calculations. Generally, the total C/I may be computed for each channel i assigned in a sector j producing some carrier power to some interference power. This may be termed co-channel C/I. This may be expressed in the following formula:

$$(C/I)_{j,i} = \frac{1}{\sum \frac{1}{(C/I)_{k,j\,pairwise}}}$$

where the sum $\Sigma$ in the above formula is for all k such that channel i is assigned to sector k.

It should be noted that $C/I_{j,i}$, the left hand side of the foregoing equation, is the total interference at sector j on channel I. Additionally, $C/I_{k,j}$ pairwise is the pairwise interference at sector j due to sector k.

Similarly, the adjacent channel C/I may be computed as:

$$(C/I)_{j,i} = \frac{1}{\sum \frac{1}{(C/I)_{k,j\,pairwise}}}$$

where the sum $\Sigma$ In the above formula is for all k such that channel i−1 or channel i+1 is assigned to sector k. Generally, as will be described in paragraphs that follow, these two types of total C/I calculations involving co-channel and adjacent channel C/I may be used as C/I constraints that may be considered when performing frequency selection, for example, using channel assignments techniques.

At step 206, frequency or channel assignments are performed in accordance with C/I calculations as performed in step 204. In particular, as will be described in conjunction with other Figures, the C/I calculations may serve as constraints in a particular embodiment of the system and may affect whether a particular channel or frequency is assigned to a particular sector or sectors. At step 208, a C/I map may be generated. Generally, the C/I map is produced as an analysis tool for assessing the quality of channel assignments. A C/I map calculation is a representation where, for each pixel representing a certain geographic area, the "worst" assignment made for a particular channel is examined. For example, in one embodiment the "worst" channel assignment may be determined in accordance with the weakest signal strength. This may assist in presenting a graphical representation of how well channels were assigned to particular sectors in accordance with certain criteria, such as strength for resulting signals, for particular channel assignments.

Figure 15:
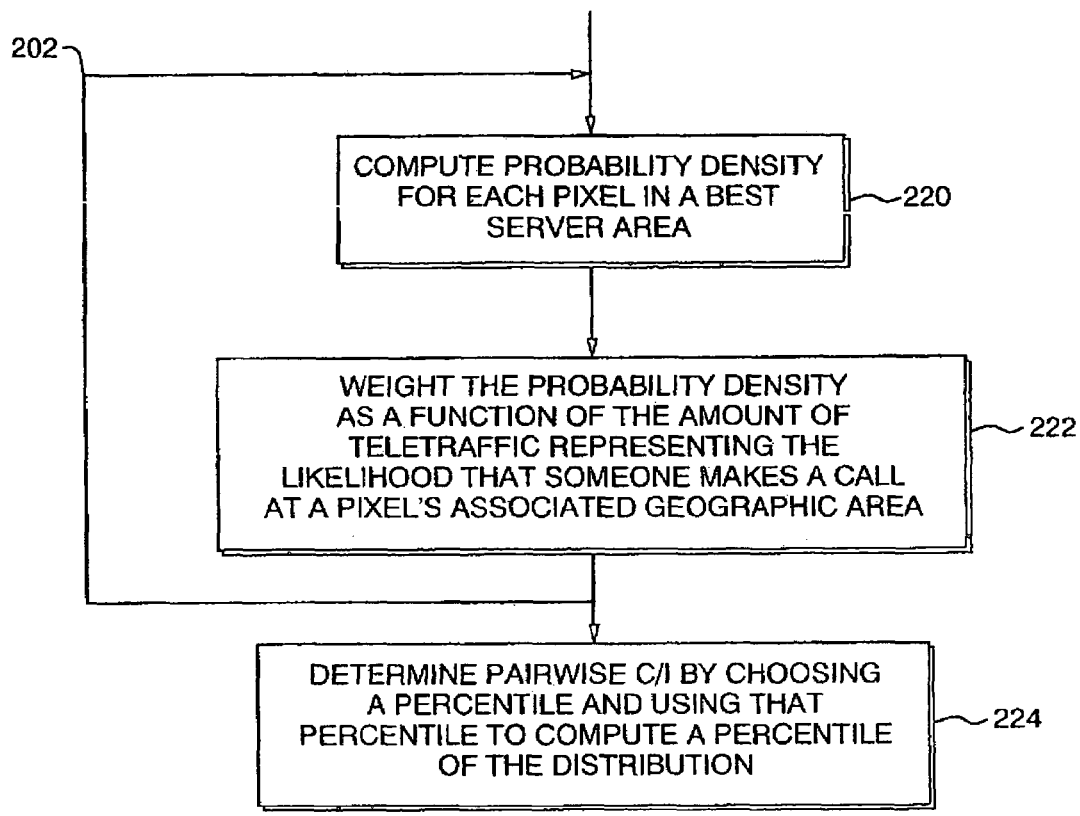
FIG. 15 is an example of a flowchart of more detailed sets for determining pairwise C/I calculations.

Referring now to FIG. 15, shown is an example of an embodiment of a flowchart that includes method steps for determining pairwise C/I. Generally, FIG. 15 is a more detailed description of step 202 from FIG. 14. At step 220, the probability density is computed for each pixel in the best server area. At step 222, the probability density is weighted as the function of the amount of teletraffic representing the likelihood that someone would make a call at a pixel's associated geographic area. Subsequent to performing the loop of steps 220 and 22 for each pixel, control proceeds to step 224. In other words, step 224 is performed collectively after steps 220 and 222 have been performed for all pixels. At step 224, pairwise C/I's are determined by choosing a percentile and computing a percentile of the distribution previously produced in step 222.

What will now be described is determining the pairwise C/I calculations as may be used in computing the total C/I for co-channel and adjacent channel constraints in determining whether to perform channel assignments.

Figure 16:
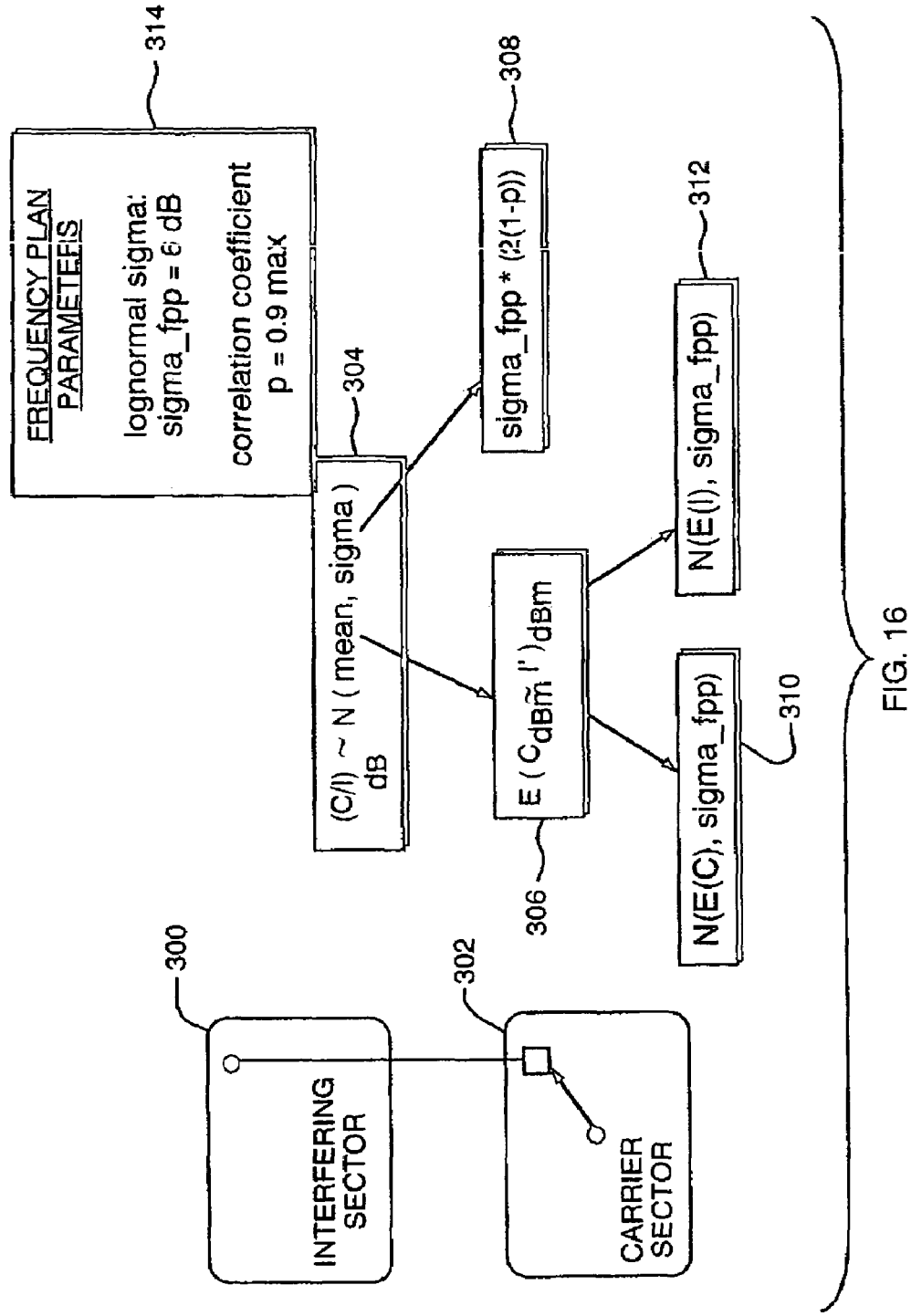
FIG. 16 is an example of an embodiment of the various formulas as may be used in performing C/I calculations.

Referring now to FIG. 16, shown is a graphical representation of the pairwise C/I calculation for an interfering sector 300 and a carrier sector 302. For each map pixel in the best server area indicated, for example, by a best server map and a sector pair, a C/I distribution is calculated. Formula 304 represents the relationship for C/I calculations being distributed with a particular mean and standard deviation. As previously described in this particular example for frequency planning as represented by box 314 of FIG. 16, frequency plan parameters are chosen such that this is a log normal distribution having a log normal sigma or standard deviation, and a correlation co-efficient of p=0.9. This may be used, for example, in the formula expressed by box 308 where sigma_fpp represents the standard deviation of C/I. It should be noted that there is an assumption of a linear drop-off to use this particular correlation co-efficient. Formula 306 relates the mean of formula 304. The mean is assumed to be normally distributed and thus the expected value or mean may be represented as in formula 306 and relates to formulas 310 and 312 also shown in FIG. 16 where N(μ,σ) represents a normal probability distribution.

Figure 17:
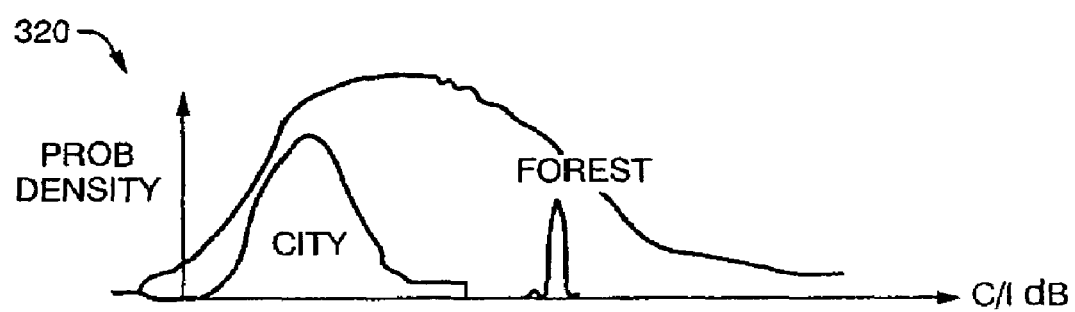
FIG. 17 is an example of an embodiment of a graphical representation of a probability density function.

Referring now to FIG. 17, shown is a graphical representation of an embodiment of the effect of traffic and angular correlation dependance in the overall C/I distribution. The graphical representation 320 illustrates traffic and angular correlation effects on C/I probability density. An interfering sector creates interference power I into a serving carrier sector with random carrier power C. The probability density for this pairwise sector interaction is accumulated as shown in FIG. 17 by weighting each locations' sample C/I probability density with the traffic at that location. The sample location for a city is shown to have a large traffic weighting relative to a sample location for a forest. Because there is a small difference in angle of arrivals for the forest example, there is a relatively high correlation between the carrier power and the interference power due to similarities in the propagation path traversed. This results in relatively less variability in the C/I sample for the forest as shown by the relatively tight distribution in the graphical representation 320.

As previously described in conjunction with FIG. 16, frequency plan parameters may be chosen, such as a sigma_fpp or standard deviation of 6 decibels, and a maximum coefficient of 0.9 with a standard percentile of 10 being chosen. In one embodiment, the weighting, as may be performed for the distribution of each location sample C/I, may be performed in accordance with a traffic map or Land Use Land Cover (LULC) map. As previously described, the probability distribution for C/I in each pixel in the best server area may be determined assuming a lognormal distribution which corresponds to cell fading and a particular interferer. Distribution has been averaged over all pixels in the best server area. The percentile for distribution may be computed characterizing the pairwise C/I for the best server area in the particular interferer. The average distribution may be formed using the cumulative probability distribution.

A measure of goodness of the assignment in terms of co-channel C/I is found by assuming all channels are in use and that the interference from each sector using the same channel is that given by a pairwise C/I estimate, as previously discussed in conjunction with the co-channel and adjacent channel C/I calculations.

Included below is a pseudo code description of the pairwise C/I calculations as may be included in an embodiment.

```
form_pairwise_CtoI (pairwise_CtoI, percent_worse)
    for interferer = first_subsector to last_subsector
        for best = first_subsector to last_subsector
        /** initialize cumul_dist */
            for grid_point - first_grid_point to last_grid_point
                cumul_dist[best, grid_point] = 0
            read_path_list(interferer) /** get pixel maps, best server **/
            for pixel = first_pixel[interferer] to last_pixel[interferer]
                best = best_server(pixel)
                if best <> NO_BEST_SERVER
                    weight = traffic(pixel)
        /** compute mean E by computing difference between C and I values for normal distribution **/
                    mean = server_power_dB(pixel) –
                        interferer_power_dB(interferer, pixel)
                    cor = correlation(best, interferer, pixel)
        /* sigma is standard deviation **/
                    sigma = DEFAULT_SIGMA * SQRT(2(1-cor))
                    grid_value = GRID_START
                    for grid_point = first_grid_point to last_grid_point
        /** compute probability density **/
                        cumul_dist[best, grid_point] = cumul_dist[best, grid_point]
                            + weight * cumulative(grid_value, mean, sigma)
                        grid_value = grid_value + GRID_SPACING
        for best = first_subsector to last_subsector
            threshold = percent_worse * total_traffic(best)
            grid_point = first_grid_point
            grid_value = GRID_START
        /** threshold is the percentile **/
            while(cumul_dist[best,grid_point] < threshold and grid_point <= last_grid_point)
                grid_point ++;
                grid_value = grid_value + GRID_SPACING
            pairwise_CtoI[interferer, best] = grid_value
```

With regard to the foregoing pseudo code, a number of assumptions have been made about the available ancillary functions. In particular, the function read_path_loss(sub_sector) makes available the path loss for all the pixels that are sufficiently close to a given subsector together with associated ranges of pixels. The function interfere_power_dB (sub_sector, pixel) uses the path loss previously made available by read_path_loss to compute the received power from a given subsector at the given pixel. The function server_power_DB (pixel) also computes the received power at the given pixel. Here, the transmitting subsector is the best server for that pixel. The corresponding path loss is not made available by a call to read_path_loss. The function traffic (pixel) gives the traffic for a given pixel which is assumed to be allocated to the best server subsector for the pixel. Recall that traffic relates to a weighted use of population information. The function total_traffic (sub_sector) gets the total traffic supported by the given subsector. It is assumed that this is equal to the total of the traffic for all the pixels for which the given subsector is the best server.

It should also be noted that the forgoing pseudo-code forms an unnormalized cumulative distribution function. The percentile threshold is normalized rather than the distribution function simply because in this particular embodiment it requires less computation. However, other embodiments may vary from this by using techniques known to those skilled in the art for each particular implementation. The normalization factor given by the foregoing function total_traffic (best) is not equal to the sum of traffic given by the function traffic (pixel) this is because the pixels within the range of a given interfere need not include all the pixels for a given best server area. It should also be noted that omitted pixels are not explicitly treated in the above pseudo-code. The omitted pixels for example correspond to pixels for which the means C/I should be very large. If they were included in the above pseudo code the shape of the cumulative distribution function may be affected only at the high end. This omission thus effects the percentile only when the C/I is large so that it does little more than indicate that there is effectively no interference from a corresponding subsector.

A note should also be made regarding the correlation. When the propagation path from the desired signal and the interferer are nearly identical, the lognormal fading of the two are highly correlated. Consequently, the standard deviation of the resulting C/I distribution is reduced. The technique for finding the angle between two propagation paths may use the angle to compute the correlation coefficient. In one embodiment, the angle between the two directions of arrival is computed using vector projection. Another embodiment may use the law of cosines which may be more computationally intensive than using vector projection. Subsequently, correlation is now a linear function of the angle when using vector projection, interpolating between a "peak value" at 0 degrees, and zero at 180 degrees. In one embodiment, such as in the GRANET embodiment, the configuration tool may be "hardwired" to use a for peak value of 0.9 for correlation coefficient. Recall, that a correlation coefficient with a peak of 0.9 for a maximum was previously described in conjunction with box 314 of FIG. 16 for the particular implementation of the described herein.

It should be noted that a pairwise C/I calculation previously described uses the ratio of carrier strength to the strength of an interfering signal for a second sector assuming the second sector is transmitting on the same frequency as the first sector. Techniques have been described which take as input traffic map or LULC information, as well as best server area path loss information, site, sector, and as well as antenna information. The foregoing techniques produce a C/I matrix representing the pairwise C/I calculations for a particular pair of sectors. Also as previously described in the foregoing, the pairwise C/I calculations as may be store for example in the C/I matrix are used in producing total or power sum C/I calculations. The total C/I may be computed for a co-channel assignment and/or adjacent channel assignment representing the ratio of the carrier power from the server on a channel to the power of all interfering signals on that channel or on adjacent channels. Total C/I may be computed for the following sets of channel assignments including, but not limited to, voice channels, signaling channels, voice channels with the same SAT, and signaling channels with the same DCC. Inputs used computing the total C/I calculations in frequency planning are the assigned frequencies per sector in the pairwise C/I calculation.

A C/I map may be generated from completed frequency plans. Generally, as previously described the C/I map represents, given a pixel in a particular best server area, the propagation functionality being used to estimate the received power from the best server and from all possible interferers. The sector with the strongest of these interferers is identified together with corresponding C/I ratio. Recall, that the C/I ratio is the difference in decibels between desired signal and interference.

Two different forms of C/I maps may be formed. For co-channel C/I, the interference comes from any sector that is assigned or any channel assigned to the best server. For adjacent channel C/I interference comes from any sector that is assigned any channel adjacent to a channel assigned to the best server. For the C/I map computations, the inputs include frequency planning or assignments as well as path loss information. Using the foregoing C/I techniques, a C/I map may be output for the strongest interferer in the particular interfere.

It should be noted that the total C/I is meaningful in the context of a particular frequency plan and may be computed for example by summing the previously computed pairwise C/I values directly. Summation may be formed as though there are constant C/I values by summing them.

Figure 18:
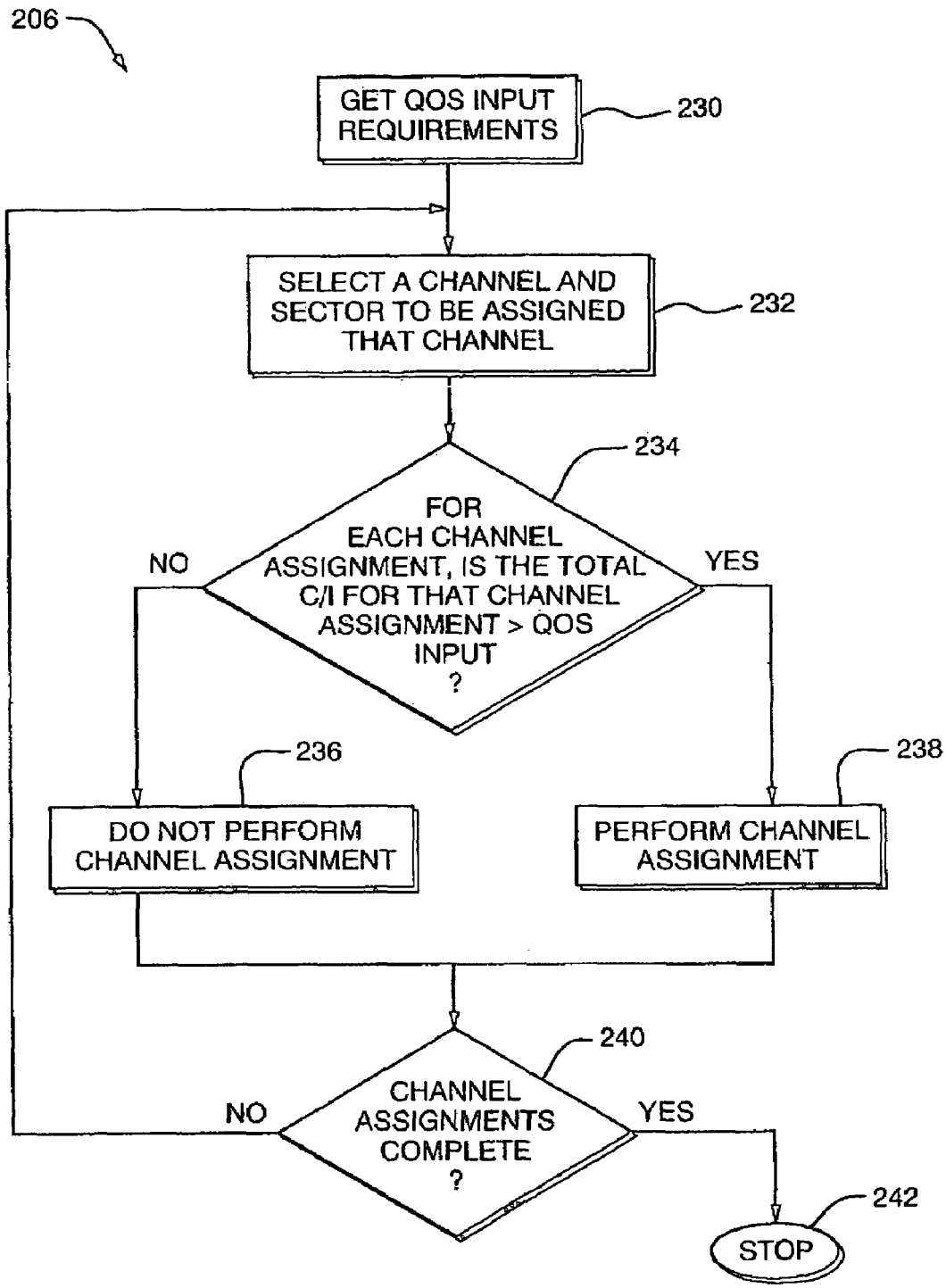
FIG. 18 is an example of an embodiment of a flowchart of method steps for performing channel assignments using C/I calculations.

Referring now to FIG. 18, shown is flowchart of an example of an embodiment of a method of performing channel assignments. FIG. 18 shows an example of a technique for performing frequency assignments 206, as may be included in the flowchart 200, step 206 of FIG. 14. Generally, flowchart 206 of FIG. 18 shows general steps of one embodiment of how input requirements and channel assignments may be used with respect to total C/I calculations in determining whether or not to perform a particular channel assignment.

At step 230, quality of service (QOS) input requirements may be obtained or calculated as needed, such as those related to C/I calculations (i.e, co-channel C/I and adjacent channel C/I). At step 232, a channel and a sector are selected. At step 234 a determination is made with respect to the particular channel and sector at step 232. A determination is made at step 234 as to whether, for each channel assignment, is the total C/I for that channel assignment greater than the QOS requirements. In other words, at step 234 a test is made considering the total C/I requirements, such as co-channel and adjacent channel C/I, to determine whether or not this channel assignment is acceptable by resulting in a total C/I computation above a predetermined QOS requirement, such as signal strength. If a determination is made at step 234 that the total C/I is greater than the quality of input, control passes to step 238 where the channel assignment is made. Otherwise, control passes to step 236 where the channel assignment is not performed. In other words, a determination has been made by proceeding to step 236 not to perform a channel assignment because predetermined QOS input constraints have not been met.

At step 240, a determination is made as to whether channel assignments are complete. If so, control proceeds to step 242 where the channel assignments are complete and the channel or frequency assignment technique stops. Otherwise, if channel assignments are not complete control proceeds to step 232 to the top of the loop where a new channel and sector are chosen.

Figure 19:
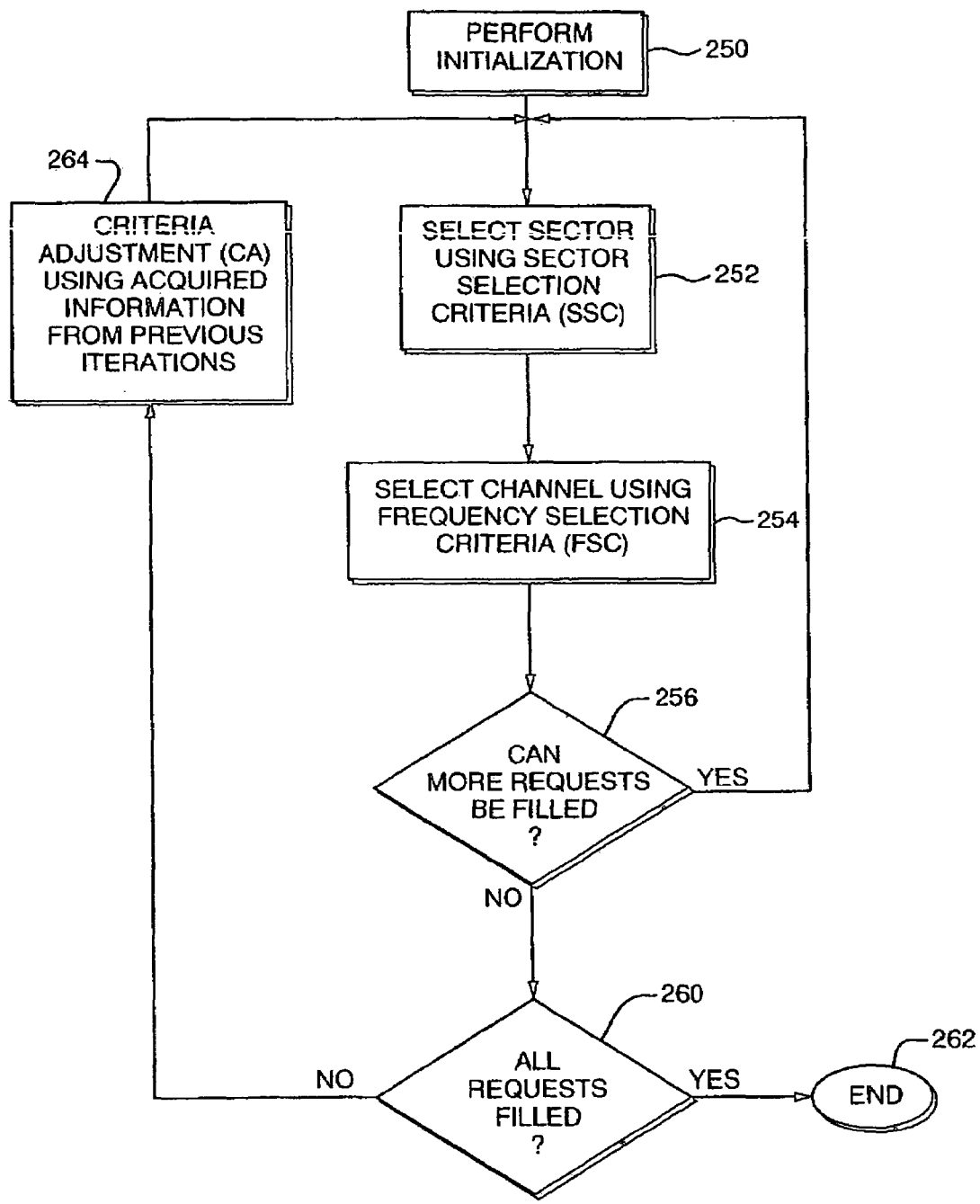
FIG. 19 is a flowchart of an example of an embodiment of another method for performing channel assignments and adjustments of criteria in accordance with previous iterations.

Referring now to FIG. 19, shown is a flowchart of a method of another embodiment for performing channel assignments. It should be noted that the flowchart in FIG. 19 may be used, for example, as an alternative to the methods steps of FIG. 18 when performing channel assignments. Generally, FIG. 19 shows a more generalized technique for performing channel assignments in accordance with criteria that effects both channel and sector selection. In an embodiment, the technique of FIG. 19 may be preferred over that of FIG. 18 since the method of FIG. 18 does not perform any adjustment to the criteria using feedback. Rather, FIG. 18 performs a selected channel assignment or fails to do so in accordance with C/I calculations and QOS input. In other words, FIG. 18 either fails or succeeds for a selected channel assignment.

At step 250, initialization is performed, for example, of any variables used in performing subsequent steps. At step 252, a sector is selected using sector selection criteria (SSC). Generally, SSC sets forth certain rules that may be used to select a particular sector. Various SSCs are described in paragraphs that follow in conjunction with other Figures. At step 234, a channel is selected using frequency selection criteria (FSC). Generally, FSC are rules which assist in selecting a particular frequency to be associated with a sector selected at step 252. At step 256, a test is made as to whether more requests for channel assignments as may be input may be filled. If a determination is made at step 256 that more requests may be filled, control proceeds to step 252 where another sector and channel are selected. If a determination is made at step 256 that more requests cannot be filled, a determination is made at step 260 as to whether all requests that have been made are filled. In other words, at step 260, a test is made to determine whether all the requested channel assignments have been made. If a determination at step 260 is made that all the requests have been filled in accordance with input configuration parameters, control proceeds to step 262 where the method of FIG. 19 ends. If at step 260 it has been determined that all requests have not been filled in accordance with input configuration data, at step 264 criteria adjustment is used to adjust the requested frequency assignments or input configuration parameters using information from previous considerations. Control then proceeds to step 252 where another sector and channel are selected.

It should be noted that the general flow of FIG. 19 takes into account various channel requests made, for example, in the form of input configuration data. In other words, as previously described, a request as to the number of channels that may be associated with each particular sector may be made via input configuration data. At times, it may be determined that it is not possible to satisfy all of the assignment requests in accordance with input configuration parameters. At this point, rather than have the method of FIG. 19 fail, certain criteria are used to adjust the requested assignments producing a modified set of rules for SSC and FSC.

The foregoing technique of FIG. 19 is an assignment technique using a sector ordering in accordance with criteria to make decisions about channels that are assigned once the sector is chosen. This criteria improves the overall assignment. Additionally, the foregoing technique takes into account past history from failed assignments and redoing requested assignments in accordance with information about prior iterations. Generally, two steps over all needed assignments are performed and then feedback information is used that may be obtained from prior iterations. The flowchart shows the basic flow of the assignment technique. The combination of a frequency and sector constitutes an assignment of a frequency to a sector that will not be removed unless further iterations are needed. At the end of the iteration, criteria used to make sector and frequency choices during the process, such as at steps 252 and 254, are automatically updated using information about the assignment acquired from prior iterations. Once a frequency is assigned to a sector, the sector is closer to filling its request requirements.

As will be described in conjunction with selection criteria, perhaps on a subsequent iteration, a different sector may be chosen as the sector candidate for the next assignment as an alternative, for example, to attempt another assignment to the same sector. The sector selection process may be applied considering the effects of the most recent assignment. For example, the newly assigned frequency may reduce the pool of frequencies available for assignment to some of the sectors and create adjacent and co-channel interference to frequencies in other sectors. Consequently, the taking into account this sector assignment in sector selection criteria may yield a different decision for the next sector.

If there are still unfilled requests at the end of execution of the loop of FIG. 19, selection criteria may be changed as in step 264 using information acquired from prior assignment iterations. Unfilled requests may be relatively difficult to fill in accordance with criteria used to make assignment decisions. Thus, in subsequent iterations, criteria may be modified in step 264 to give priority to the relatively more difficult sectors at the expense of the relatively easy sectors.

Referring now to FIGS. 20A, 20B, and 21, shown is an example of an embodiment of the different criteria that may be used as in performing the method steps for FIG. 19 for channel assignments.

Referring to FIGS. 20A, 20B, example criteria is set forth in the table 400. The table 400 includes sector selection criteria (SSC) 410, frequency selection criteria (FSC) 420 and criteria adjustment selection 422. Each of these portions of information 410, 420 and 422 may respectively be used in their appropriate processing steps of FIG. 19. For example, sector selection criteria 410 includes two sector selection criteria SSC1 and SSC2. Sector selection criteria may be presented in some type of hierarchical arrangement, for example, where the SSC1 criteria is known to be simple and easier to calculate than those at subsequently higher criteria levels such as SSC2. For example, the SSC2 criteria 412 involves frequency separation constraints and C/I constraints and calculations. The C/I constraints, for example, may be the co-channel and adjacent channel total C/I calculations as previously described. Similarly, the frequency selection criteria portion 420 includes performing various calculations as may be involved in different constraints. For example, the FSC1 423 includes examining C/I or frequency separation constraints. Thus, use of FSC1 includes performing C/I calculations, for example, such as the total co-channel and adjacent channel C/I calculation as well as considering the frequency separation constraints as may be represented in the channel separation matrix.

It should be noted that various criteria, such as SSC1, which takes into account a "bias" that is an accumulated bias over past iterations determined by criteria adjustment. In other words, "bias" represents a feedback metric or learning quantity as may be used as a weighting factor when choosing a particular sector. This bias may be increased or decreased with regard to whether a sector has had recent difficulties in prior iterations. This bias is updated in the adjustment criteria 422. Thus, the bias being adjusted in step 264 of FIG. 19 may result in a learning process and feedback for subsequent selections of sectors and channels as performed in steps 252 and 254, respectively, in accordance with criteria 410 and 420.

Referring now to FIG. 21, shown is an additional example of sector selection criteria 430 which includes SSC3 and SSC4. It should be noted that the SSC3 criteria includes a parameter identifying an allowable number or desired shortage. This desired shortage may be defined to represent a threshold or percentage level identifying a maximum acceptable shortage with regard to the number of requested channels for a particular sector. For example, for sector A, 10 channels may be requested. The shortage threshold, as used in SSC3, may be 20% level or 2 channels. Thus, this parameter states that even though 10 channel assignments for Sector A may be preferred or ideal, if this cannot be accomplished with regard to performing channel assignments for the network, as little as 8 channel assignments is acceptable for sector A. Use of this additional threshold shortage specifies a minimum level or number of acceptable channels for a sector. In effect, this allows the selection criteria to perform channel assignments using a range of acceptable channel assignments for a sector.

It should be noted that using this shortage percentage or shortage threshold may be used as an alternative to techniques which either succeed or fail. In other words, this shortage threshold provides for a range of acceptable configurations rather than a binary indication of success or failure for a single set of channel requests.

It should also be noted that this threshold value may be useful in instances, for example, when an impossible configuration is initially requested. In other words, an initially requested channel assignment request may be impossible to produce in accordance with constraints. Thus, having a shortage threshold may allow the channel assignment technique to possibly find other acceptable alternatives.

It should be noted that other embodiments may include one or more of the foregoing selection criteria for frequency and sector selection as well as different adjustment criteria, such as bias, that are used and updated when performing subsequent sector and channel selections. Other embodiments may use different criteria than that which has been described in the example tables in FIGS. 20A, 20B, and 21. Any one of a variety of different criteria known to those skilled in the art may be used in conjunction with the general feedback process shown in FIG. 19.

It should be noted that the bias used in the foregoing description and figures may refer to a bias that represents an integer quantity. Other embodiments may include a bias expressed in a different numeric or other form. It should also be noted that the FSC and SSC may both be adjusted using the same global bias. Alternatively, an embodiment may use a first bias for FSC and a second different bias for SSC.

Referring now to FIG. 22, shown is an example of an embodiment of a table 440 showing various combinations of the previously display selection criteria in accordance with differently rated levels of complexity. For example, complexity option zero in this example is the less complex option with regard to the calculations involved with SSC1 and FSC1. At the other end of the spectrum of the information in the table 440, complexity option 4 includes the most complex calculations, for example, involving SSC2 and FSC3. Accordingly, in an implementation of the channel assignment technique as previous described, a user may select a level of complexity, (e.g., 0 through 4), without getting involved in the particular frequency or sector selection criteria. Rather, an intuitive approach is taken by rating the different combinations of frequency and sector selection criteria with the various complexities or time computations that may be required in performing the sector and frequency selections.

The foregoing techniques may use complex criteria requiring computationally intensive calculations for performing and evaluating channel assignments. Generally, as known to those skilled in the art, the channel assignment problem is an N-P complete problem. Further, calculations such as those included in performing C/I calculations may be very computationally time consuming. Thus, it may be desirable to choose specific SSC and/or FSC in accordance with this time consideration. In other words, in effect, the amount of time is a cost or constraint to be considered when determining the level of complexity of the selection criteria used in the channel assignment techniques.

In one embodiment, an acceptable amount of time or time threshold may be used. This time threshold may be expressed in, for example, but not limited to, an amount of CPU time, an amount of elapsed time, or other form.

Figure 23:
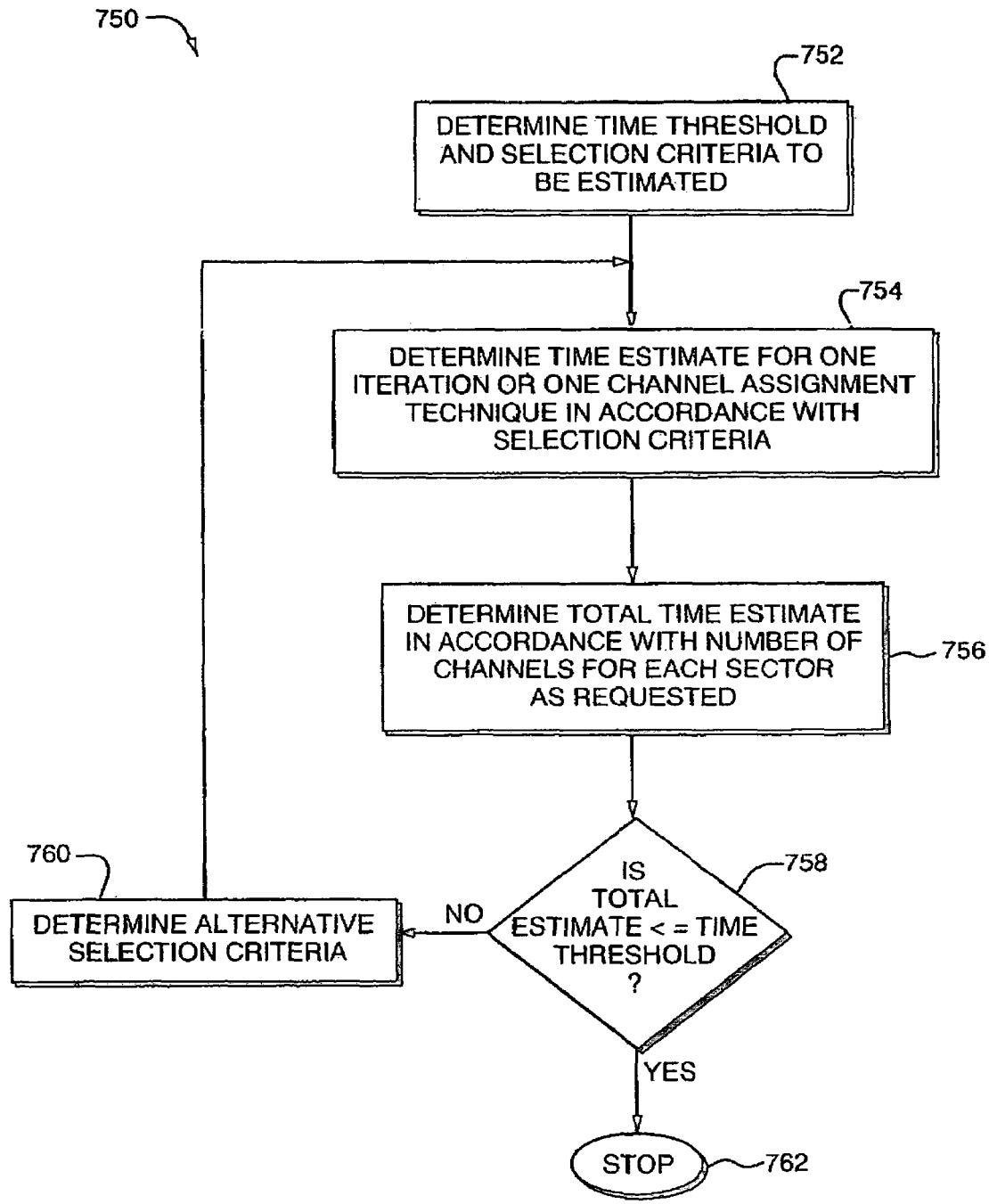
FIG. 23 is a flowchart of an example of an embodiment of a method for determining acceptable selection criteria used in performing channel assignments.

Referring now to FIG. 23, shown is a flowchart of an example of an embodiment of a method for determining selection criteria to be used in performing channel assignments. The flowchart 750 includes steps that may be used to estimate the time in performing channel assignments using certain selection criteria. At step 752, a time estimate and selection criteria are determined. These may be input, for example, from a user such as via an input file including values for these items. Alternatively, these may also be specified interactively, as via keyboard or other input selection. For example, a time threshold of 3 days (72 hours) and using SSC3 and FSC3 may be selected. At step 754, a time estimate for one iteration or one channel assignment be technique in accordance with selection criteria is determined. This may performed using various estimation techniques. In one embodiment, a single iteration may actually be performed which performs one channel assignment to one sector. At step 756, a total time estimate is obtained by multiplying the single time estimate from step 754 to arrive at a total time estimate in accordance with the channel assignments to be made for all sectors in the network. At step 758, a determination is made as to whether the total time estimate is within the acceptable time threshold determined at step 752. If it is, control proceeds to step 762 where the selection criteria is deemed "acceptable" in accordance with the time threshold. Otherwise, control proceeds to step 760 where new selection criteria is determined. The new selection criteria is then estimated in accordance with steps formed by the loop previously described. It should be noted that an embodiment may also specify a threshold to be used in arriving at a time estimate in terms of the number of loop iterations to perform a channel assignment it should also be noted that variations of the foregoing flowchart 750 may be made in other embodiments. For example, an additional step may be included allowing a user to re-enter a time threshold since after several failures, a user may realize that an unrealistic time threshold was entered that will not result in any criteria being deemed acceptable for use.

What will now be described is a technique that may be used in generating color code assignments, such as DCCs or SATs, using channel assignment techniques. Color codes as previously described may be used in determining which sector is responsible for a signal received at a mobile unit. Generally, a channel assignment may be reused, for example, such that two or more sectors operate at the same channel or frequency. Use of a color code in combination with a channel frequency is one technique that may be used to distinguish between signals generated by these two or more sectors. A color code may be chosen for each frequency that is reused. Thus, a color code may be selected for a sector associated with a channel since the channel is used multiple times.

Assigning color codes may be done with a variation of the previously described channel assignment techniques. In the previously described channel assignment techniques, QOS input including constraints may be input to the configurator 12. For a color code assignment, there are modifications to these inputs previously described.

Figure 24:
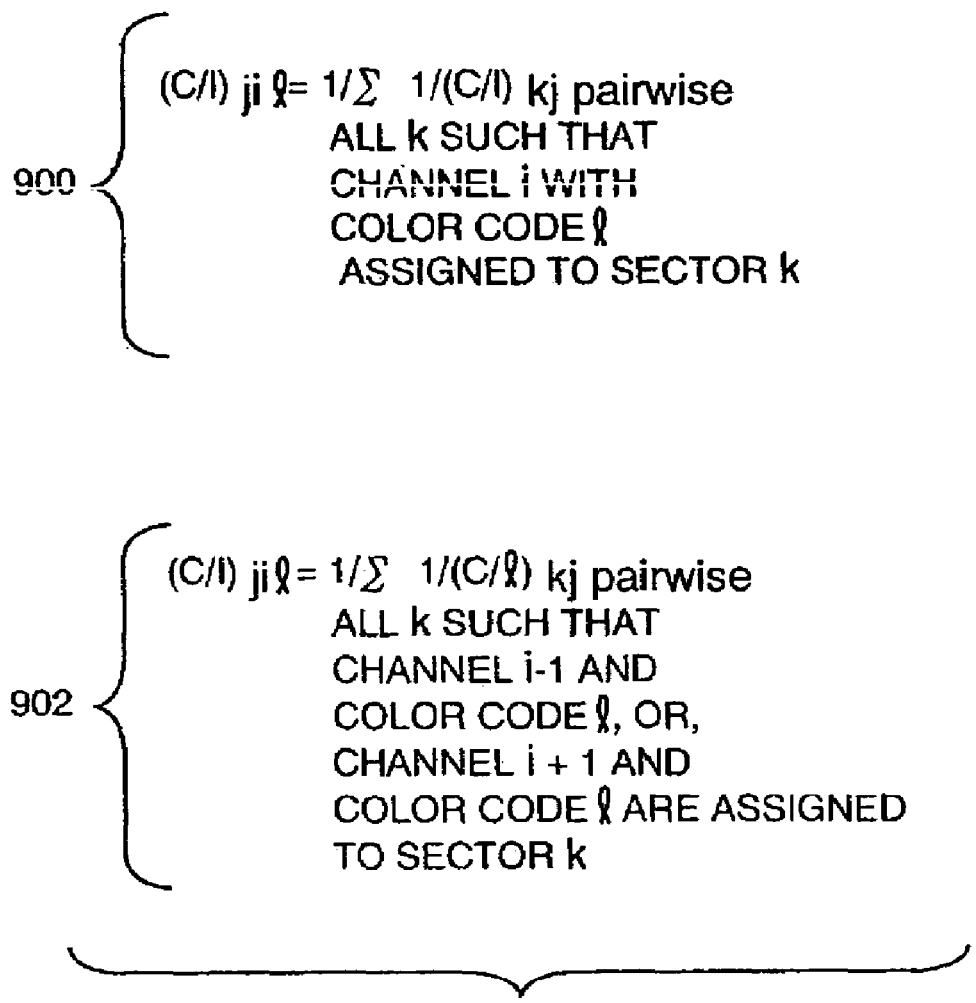
FIG. 24 is an example of a representation of C/I calculations that may be used when performing color code assignments.

One modification is in the C/I calculations. The total co-channel C/I and total adjacent channel C/I formulas are modified to include reference to a color code "1". Referring now to FIG. 24, shown is an example of an embodiment of formulas including the color code in the C/I calculations. In particular, formula 900 represents the total co-channel co-color code C/I calculation, and formula 902 represents the total adjacent channel co-color code C/I calculation as may be used in color code assignments. This will be described in more detail in paragraphs that follow.

Another modification that may be included involves the channel separation matrix. In this embodiment, the channel separation matrix represents a color code separation matrix. In this use, the channel separation matrix is tightened. In particular, for each entry in the matrix which represents a common neighbor having a zero in the matrix entry, it is replaced with a 1. Recall that a zero indicates that two sectors could be assigned or use the same frequency. Replacing the zero with a 1 indicates that the same color code cannot be used for sectors associated with the matrix entry. Generally, common neighbor refers to the sector B that is a common neighbor to both sectors A and C. In other words, sector B may be handed off a signal from both sector A and sector C. A portion of the constraint or channel separation matrix may be used as will also be described in more detail in paragraphs that follow.

Figure 25:
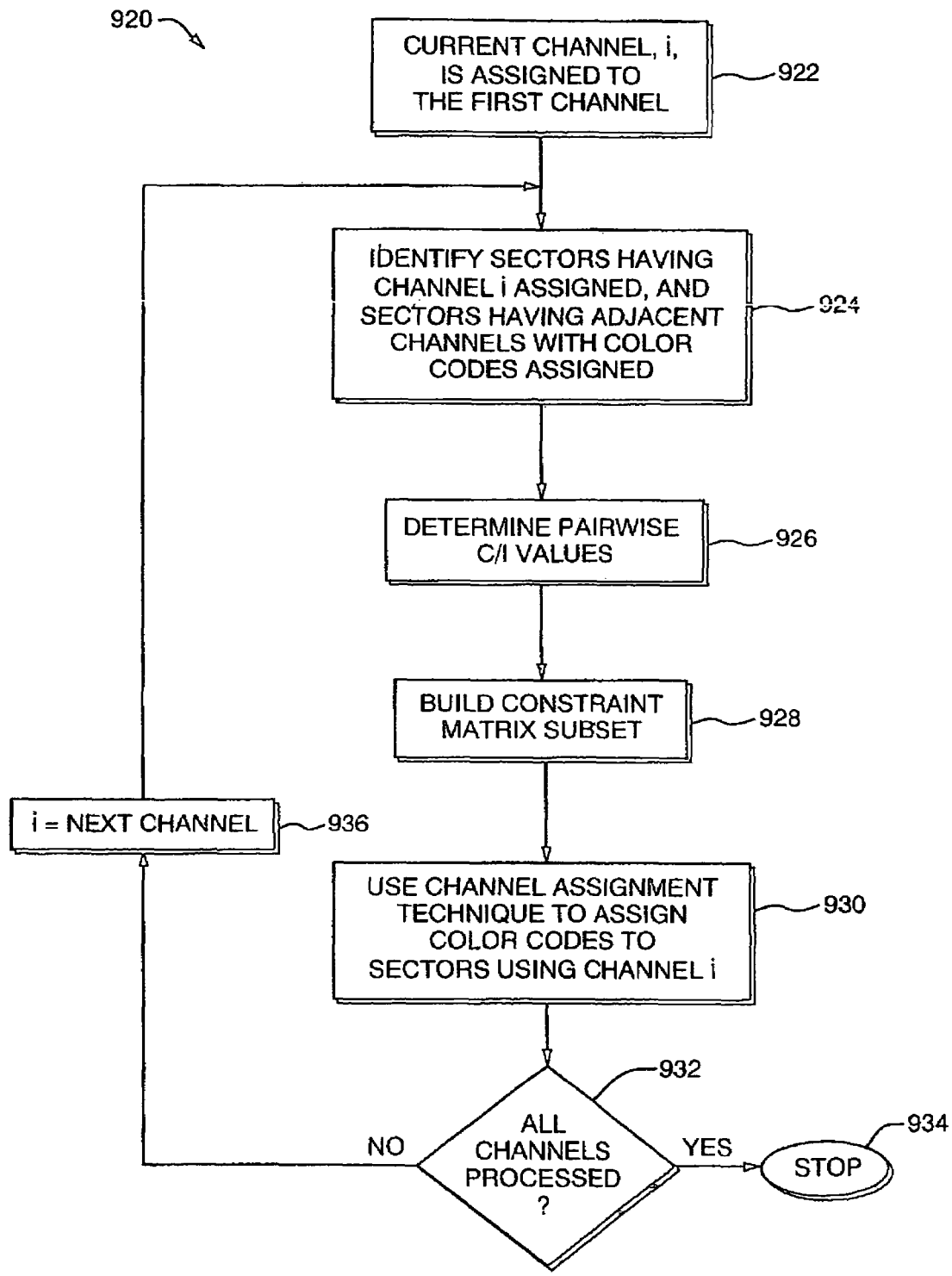
FIG. 25 is a flowchart of an example of an embodiment of a method of performing color code assignments.

Referring now to FIG. 25, shown is a flowchart of an example of a method for performing color code assignments. In the following description, the modified C/I formulas and modified constraint matrix are referred to and related to steps of the color code assignment technique.

At step 922, a current channel variable "i" is assigned the first channel requiring color code assignments. Control proceeds to step 924 where sectors having channel i assigned to it and channels currently having color codes are assigned are identified. As a result of step 924, two subsets of sectors are identified. A first subset of sectors are those sectors associated with channel i requiring a color code assignment on this loop iteration. A second subset of sectors are those sectors associated with an adjacent channel to channel i, (e.g., channel i-1 and i+1) and pre-existing assignments, in which the sector already has a color code associated with the sector.

At step 926, pairwise C/I values are determined. In one embodiment, the pairwise C/I values are a submatrix or subset of the previously described C/I matrix. This submatrix may be represented by a square matrix having a dimension that is equal to or less than the existing C/I matrix previously described. This submatrix includes those pairwise C/I values having subscripts of sectors i,j corresponding to sectors identified in step 924. In other words, for every pair of sectors i and j identified in step 924, the pairwise C/I values corresponding to subscripts i,j and j,i are included in the submatrix. If this first embodiment of the pairwise C/I values is used, the modified cochannel and adjacent channel total C/I formulas 900 and 902 may be included and used in performing color code assignments in step 930, which is described in following paragraphs.

A second embodiment of step 926 determines pairwise C/I values by adjusting a portion of the pairwise C/I values as may be included in the pairwise C/I matrix. In particular, the pairwise C/I values for those adjacent channel sectors as identified in step 924 are adjusted. The C/I values correspond to those values associated with the second subset of sectors identified in step 924. These C/I values are adjusted by a predetermined value. In one instance this predetermined value may be the difference between the co-channel and adjacent channel thresholds that may serve as QOS inputs in a channel assignment process. If this second embodiment of the pairwise C/I values is used, the channel assignment technique which assigns the color codes to the sectors performs such that the comparison of the total C/I adjacent channel threshold test always succeeds. Additionally, the similar total co-channel C/I threshold test takes into account the co and adjacent channel C/I by using the adjusted C/I values just described.

Generally, step 926 takes into account filtering of a signal by transmitters and receivers. This may be performed, for example as in the second step 926 embodiment, by adding to the pairwise C/Is the difference between co-channel and adjacent channel constraints.

At step 928, a subset constraint or channel separation matrix is formed. This constraint matrix is also a subset of the previously described channel separation matrix. This subset channel separation matrix produced as a result of step 928 may include the more stringent channel separations for those sectors identified in step 924. Alternatively, the subset channel separation matrix may include a subset of the original channel separation matrix without being modified to include more stringent channel separations. It should be noted that this subset matrix may be used in step 930 in determining color code assignment.

Control proceeds to step 930 where a channel assignment technique is used to assign color codes to sectors. In a channel assignment technique, frequencies or channels, and sectors are the two sets of items being associated. Alternatively, in this instance for color code assignments, there is a set of color codes to be assigned, and a set of sectors to which these may be assigned. The set of color codes is the set of all possible color codes available. The set of sectors are those sectors produced as a result of step 924, the first subset of sectors which are associated with channel i and require a color code assignment on this iteration using the channel assignment technique at step 930.

At step 932, a determination is made as to whether all channels or frequencies have been processed. If so, control proceeds to step 934 where the method 920 stops. Otherwise, control proceeds to step 936 where "i" is assigned the next channel for which color codes are assigned.

It should be noted that the foregoing suggests modifications to the channel assignment technique to assign or associate color codes with sectors. The following summarized some of the analogous items and steps previously described as used in channel assignment and the color code assignment elements.

| Channel assignment | Color code assignment |
|---|---|
| A. associates a sector with a channel | A. associates a color code with a sector |

-continued

| Channel assignment | Color code assignment |
| --- | --- |
| B. a sector is chosen from a set of sectors requiring channel assignment | B. a sector is chosen from a set of sectors requiring a color code assignment for the channel currently being examined |
| C. a channel is chosen from a set of system channels | C. a color code is chosen from a set of system color codes |
| D. channel separation matrix | D. subset of channel separation matrix (note may include modified separation values) |
| E. pairwise C/I values | E. subset of pairwise C/I values (note may include adjusted C/I values or just subset of original values. | while the invention has been disclosed in connection with preferred embodoiments shown and described in deatail, their modifacations and improvement thereon will become readily appart to those skilled in the art. Accordingly, the spirt and scope of the present invention should be limited only by the following claims.

The invention claimed is:

1. A method for differentiating sectors in a cellular network that are associated with the same frequency, the method comprising:
   receiving requests for associating frequencies with each of the sectors in the cellular network,
   based on sector selection criteria and frequency selection criteria, associating the frequencies with sectors to fulfill the requests,
   identifying two or more sectors that are each associated with a common frequency,
   associating different digital color codes with the two or more sectors based on the sector selection criteria and further based on color selection criteria that is based on the frequency selection criteria; and
   iteratively returning to identifying a different two or more sectors that are each associated with a different common frequency.

2. The method of claim 1, further comprising generating the color selection criteria that are identical to the frequency selection criteria, in which references to the colors in the color selection criteria correspond to references to frequencies in the frequency selection criteria.

3. A computer readable medium encoded with computer executable instructions to cause a processor to:
   receive requests for associating frequencies with each sector in a cellular network,
   based on sector selection criteria and frequency selection criteria, associate the frequencies with sectors to fulfill the requests,
   identify two or more sectors that are associated with a common frequency,
   associate different digital colors codes with the two or more sectors based on the sector selection criteria and further based on color selection criteria that is based on the frequency selection criteria; and
   iteratively return to identify a different two or more sectors that are each associated with a different common frequency.

4. The computer readable medium of claim 3, further comprising instructions to generate the color selection criteria that are identical to the frequency selection criteria, in which references to colors in the color selection criteria correspond to references to frequencies in the frequency selection criteria.

* * * * *